(12) United States Patent
Pu et al.

(10) Patent No.: US 10,798,623 B2
(45) Date of Patent: Oct. 6, 2020

(54) METHOD FOR PROCESSING RADIO SIGNALS AND MOBILE TERMINAL DEVICE

(71) Applicant: Intel IP Corporation, Santa Clara, CA (US)

(72) Inventors: Tian Yan Pu, Santa Clara, CA (US); Juergen Kreuchauf, San Francisco, CA (US); Habib Djandji, Paris (FR); Thorsten Clevorn, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/751,149

(22) Filed: Jun. 26, 2015

(65) Prior Publication Data

US 2016/0381610 A1   Dec. 29, 2016

(51) Int. Cl.
*H04W 36/00* (2009.01)

(52) U.S. Cl.
CPC ... *H04W 36/0094* (2013.01); *H04W 36/0055* (2013.01)

(58) Field of Classification Search
CPC .................. H04W 36/0094; H04W 36/0055
(Continued)

(56) References Cited

U.S. PATENT DOCUMENTS

| 8,639,251 B2 * | 1/2014 | Gunnarsson .......... H04W 36/04 455/436 |
| 8,655,368 B2 | 2/2014 | Dimou et al. |

(Continued)

FOREIGN PATENT DOCUMENTS

| CN | 102204329 A | 9/2011 |
| EP | 2465296 | 6/2012 |

(Continued)

OTHER PUBLICATIONS

"Mobility Parameter Planning for 3GPP LTE: Basic Concepts and Intra-Layer Mobility" by Jari Salo published Jun. 10, 2013 at http://www.lteexpert.com/lte_mobility_wp1_10June2013.pdf.*

(Continued)

*Primary Examiner* — Amancio Gonzalez
(74) *Attorney, Agent, or Firm* — Kowert, Hood, Munyon, Rankin & Goetzel, P.C.

(57) ABSTRACT

A mobile terminal device may include a measurement circuit, a critical scenario identification circuit, and a measurement report control circuit. The measurement circuit may be configured to measure one or more received radio signals to generate one or more measurement results. The critical scenario identification circuit may be configured to perform a comparison between a first set of the one or more measurement results and predefined criteria associated with handover disruption. The measurement report control circuit may be configured to select a selected reporting configuration from a default handover speed reporting configuration and an accelerated handover speed reporting configuration based on the comparison, wherein the accelerated handover speed reporting configuration produces a lower expected handover latency than the default handover speed reporting configuration and to transmit a second set of the one or more measurement results according to the selected reporting configuration.

20 Claims, 7 Drawing Sheets

(58) Field of Classification Search
USPC .......................................................... 455/436
See application file for complete search history.

(56) References Cited

U.S. PATENT DOCUMENTS

| | | |
|---|---|---|
| 2004/0248605 A1 | 12/2004 | Cao et al. |
| 2008/0170557 A1 | 7/2008 | Yin |
| 2009/0143093 A1 | 6/2009 | Somasundaram et al. |
| 2009/0325501 A1* | 12/2009 | Somasundaram .... H04W 36/30 455/67.11 |
| 2011/0188472 A1 | 8/2011 | Jeon et al. |
| 2011/0237259 A1 | 9/2011 | Dimou et al. |
| 2012/0202482 A1* | 8/2012 | Katepalli .......... H04W 36/0083 455/423 |
| 2013/0155881 A1 | 6/2013 | Amerga et al. |
| 2013/0183970 A1 | 7/2013 | Chen et al. |
| 2014/0357275 A1* | 12/2014 | Quan ................ H04W 36/0094 455/436 |

FOREIGN PATENT DOCUMENTS

| | | |
|---|---|---|
| EP | 2756708 | 7/2014 |
| EP | 2779749 A1 | 9/2014 |
| GB | 2516463 A | 1/2015 |
| JP | 2013541286 A | 11/2013 |
| KR | 1020110090644 A | 8/2011 |
| WO | 2015000912 A1 | 1/2015 |

OTHER PUBLICATIONS

Office Action received for the corresponding KR Patent Application 10-2016-0064375, dated Apr. 13, 2017, 7 pages of Office Action and 6 pages of English translation.
"Stage 3 signaling for fast handover using RSRP/RSRQ with SToS/Ping-pong avoidance", 3GPP TSG RAN WG2 Meeting #83bis, R2-133504, Oct. 2013.
European Search Report received for the corresponding EP Patent Application 16 17 1187.4, dated Nov. 25, 2016, 3 pages.
"Fast Handover using RSRP/RSRQ with SToS/Ping-pong Avoidance", 3GPP TSG RAN WG2 Meeting #83, R2-132809, 3rd generation partnership project (3GPP), Aug. 2013.
Grant of patent for parallel Korean Patent application 10-2016-0064375, dated Oct. 16, 2017 (1 page and 1 page translation).
Office Action received for the corresponding CN Patent Application No. 201610357156.4, dated Dec. 19, 2018, 8 pages (Reference Purpose Only).
Office Action received for the corresponding EP Patent Application No. 16 171 187.4, dated Jan. 31, 2019, 11 pages (Reference Purpose Only).
Examination Report—Application No. 201644015800, dated Dec. 30, 2019, 8 pages.
Examination Report—Application No. 201644016041 dated Dec. 19, 2019, 6 pages.

\* cited by examiner

METHOD FOR PROCESSING RADIO SIGNALS AND MOBILE TERMINAL DEVICE

TECHNICAL FIELD

Various embodiments relate generally to a method for processing radio signals and a mobile terminal device.

BACKGROUND

Mobile communication terminals experiencing poor radio link conditions may undergo handover procedures in order to reconfigure a radio access link over a wireless network. According to Third Generation Partnership Project (3GPP) protocols, the serving base station currently supporting an active connection with the mobile communication terminal may transfer the active connection from the current radio channel to a different radio channel, such as a channel associated with a different cell of the serving base station or to a channel associated with a cell of another base station.

The serving base station may identify an appropriate neighbor cell for handover of the mobile communication terminal based on measurements reported by the mobile communication terminal. The serving base station may accordingly receive one or more measurement reports from the mobile communication terminal containing measurement information associated with one or more neighbor cells. The serving base station may subsequently select an appropriate neighbor cell and initiate handover procedures for the mobile communication terminal with the selected neighbor cell.

However, handover procedures may be complicated due to poor radio conditions between the mobile terminal and the serving base station. As a result, the handover procedures may be excessively delayed, and the mobile terminal may continue to experience poor radio conditions until the handover procedures are successfully completed. For example, such a mobile terminal may experience a high block error rate (BLER) in communications with the serving base station. These high BLER conditions may be caused by excessive interference from a neighbor cell (i.e. another cell of the serving base station or a cell of a nearby base station), and may be triggered by migration of one or more additional mobile communication terminals from the serving cell of the serving base station of the victim mobile communication terminal to the neighbor cell. Handover procedures may be significantly delayed due to the high BLER conditions, thereby degrading user experience.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
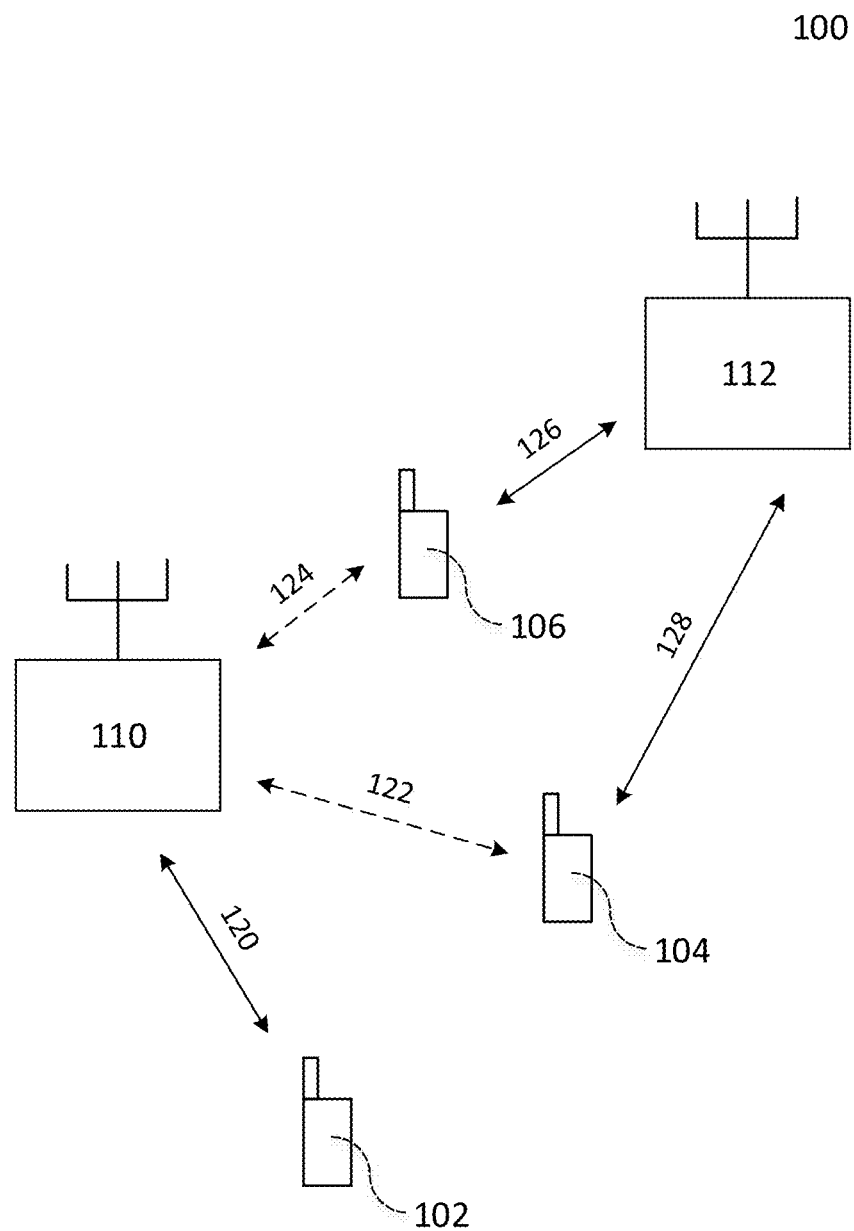
FIG. 1 shows a mobile radio communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

As used herein, a "cell" in the context of telecommunications may be understood as a sector served by a base station. Accordingly, a cell may refer to a set of geographically co-located antennas that correspond to a particular sectorization of a base station. A base station may thus serve one or more "cells" (or sectors), where each cell is characterized by at least one distinct communication channel. An "inter-cell handover" may thus be understood as handover from a first "cell" to a second "cell", where the first "cell" is different than the second "cell". "Inter-cell handovers" may be characterized as either "inter-base station handovers" or "intra-base station handovers". "Inter-base station handovers" may be understood as handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" which a mobile terminal is currently connected to according to the mobile communication protocols of the associated mobile communication network standard.

A user equipment (UE) may experience radio link conditions during communication over a cellular network where handover procedures are excessively delayed. Handover procedures should therefore be completed in a short period of time in order to avoid radio link failure. Accordingly, it may be possible to execute procedures to reduce handover latency, i.e. to reduce the amount of time before a handover is initiated and/or completed. The associated procedures may therefore be associated with reduced expected handover latency than default procedures, i.e. have a lower expected time before a handover is initiated and/or completed than the expected time before a handover is initiated and/or completed according to the default procedures.

For example, as shown in FIG. 1, UEs 102-106 may be initially located in a first cell of enhanced nodeB (eNB) 110, and may accordingly communicate with eNB 110 over air interfaces 120-124. Air interfaces 120-124 may each be a wireless channel associated with the first cell. Mobile communication network 100 may further include eNB 112.

UEs 102-106 and eNBs 110 and 112 may be configured to operate as part of a Third Generation Partnership Protocol (3GPP) network, such as e.g. a Long Term Evolution (LTE) network. Mobile communication network 100 may thus be an LTE network. UEs 102-106 may each be engaged in an active communication session with eNB 110, and accordingly UEs 102-106 may each be in Radio Resource Control (RRC) Connected (RRC_Connected) mode.

As each of UEs 102-106 may be in RRC_Connected mode, eNB 110 may be responsible for managing the mobility of each of UEs 102-106. eNB 110 may therefore provide UEs 102-106 with a Radio Resource Control (RRC) Connection Reconfiguration message, which may define mobility procedures of each of UEs 102-106. The RRC Connection Reconfiguration message may therefore influence an aspect of handover procedures for each of UEs 102-106.

For example, the RRC Connection Reconfiguration message may instruct UEs 102-106 to perform measurements of the serving cell and neighbor cells according to a measurement reporting configuration. UEs 102-106 may then perform the measurements as instructed and transmit measurement reports containing the results of the measurements back to eNB 110. As will be later described, UEs 102-106 may transmit measurement reports according to a variety of different measurement reporting configurations.

eNB 110 may then determine whether handover of any of UEs 102-106 should be executed based on at least the measurement reports received from each of UEs 102-106. The measurement reports may contain measurements of signal characteristics for one or more cells, such as signal power and signal quality measurements of reference signals transmitted in the one or more cells. For example, eNB 110 may instruct each of UEs 102-106 to perform cell measurements of one or more cells of serving eNB 110. UEs 102-106 may accordingly measure signal characteristics of the serving cell (i.e. the first cell of eNB 110) and one or more further cells of eNB 110. As the one or more further cells are not the current serving cell for UEs 102-106, the associated measurements performed thereon may be characterized as "neighbor cell measurements". UEs 102-106 may additionally perform cell measurements of cells of one or more additional base stations, such as cells of eNB 112. The measurements of the cells of eNB 112 may similarly be characterized as neighbor cell measurements. UEs 102-106 may then provide the resulting cell measurements to the serving cell at eNB 110 as measurement reports according to the specified measurement reporting configuration.

UEs 102-106 may experience degrading radio link conditions over respective air interfaces 120-122 with the first cell of eNB 110, which may be attributed to a variety of common factors such as random noise, UE location, cell load, etc. The deteriorating radio link conditions may be represented in the measurement reports transmitted to eNB 110, such as e.g. by a one or more measurement reports that indicate that a signal characteristic of the serving cell (first cell of eNB 110) is decreasing in an undesirable manner. Accordingly, eNB 110 may determine that a handover of one or more of UEs 102-106 should be performed based on the received measurement reports. For example, eNB 110 may determine that handover of UEs 104 and 106 should be executed from the first cell of eNB 110 to a second cell, such as a cell of eNB 112. Accordingly, the measurement reports transmitted by UEs 104 and 106 may indicate strong signal measurements of the second cell of eNB 112, and may e.g. satisfy predefined criteria used in handover flow protocols associated with mobile communication network 100. eNB 110 may then initiate the associated handover procedures in order to transfer the active connection for each of UEs 104 and 106 to the second cell of eNB 112, thereby releasing respective air interfaces 122 and 122. New air interfaces 126 and 128 may then be established between UEs 104 and 106 to communicate with the second cell of eNB 112.

However, UE 102 may not immediately handover to the second cell of eNB 112, and may remain connected to the first cell of eNB 110 over air interface 120. For example, the measurement results reported by UE 102 may not be sufficient to satisfy the specific criteria for initiation of a handover (such as e.g. predefined criteria of handover flow protocols utilized by mobile communication network 100), and serving eNB 110 may therefore not initiate handover of UE 102.

Concurrently, UEs 104 and 106 may complete handover to the second cell of eNB 112 and may begin communicating with the second cell of eNB 112 over respective air interfaces 126 and 128. As is conventional in many cellular networks, mobile communication network 100 may utilize a frequency reuse factor of 1. Accordingly, active air interfaces 120, 126, and 128 currently in use between UEs 102-106 and eNBs 110-112 may all utilize substantially the same radio frequency. As a result, air interfaces 126 and 128 may impose significant interference on air interface 120, thereby contributing to further degradation of the radio link of UE 102. UE 102 may therefore be a victim UE.

UE 102 may continue to provide the first cell of eNB 110 with further measurement reports characterizing the measurements of the first cell and other nearby cells, including further cells of eNB 110 and one or more cells of eNB 112. The further measurement results reported by UE 102 may satisfy the predefined criteria for handover initiation as dictated by the network, and eNB 110 may begin to initiate handover procedures for UE 102 to a further cell of eNB 110 or eNB 112. However, the increased interference caused by the newly established radio links between UEs 104 and 106 over respective air interfaces 126 and 128 may prevent a successful handover to a new cell. For example, the increased interference may result in a high BLER for communications over air interface 120. Accordingly, UE 102 may continue to experience poor radio link quality over air interface 120 with the first cell of eNB 110 due to the increased interference, potentially leading to severe negative impacts on data usage (e.g. browsing or streaming) or interactive services (e.g. voice or video calls).

The handover procedure may thus be excessively delayed (i.e. excessive handover latency). UE 102 may need to perform lengthy re-establishment procedures following potential radio link failure prior to successful completion of a handover from the degraded serving cell at eNB 110. UE 102 may therefore remain in poor radio link conditions for an extended period of time until handover is successfully completed, thereby degrading user experience.

Accordingly, a scenario in which one or more UEs migrate from a degraded serving cell to a nearby cell may cause significant problems for a victim UE that remains on the degraded cell. A number of real-world situations exits where such scenarios may occur, such as e.g. passengers on a bus, pedestrians walking down the same stream, or vehicular traffic along a busy highway.

It is appreciated that the above-detailed scenarios have been described in relation to inter-base station handovers in which several UEs undergo handover to a cell of a different base station, i.e. to a non-synchronized cell. However, similar problems related to handover latency may be similarly introduced when several UEs undergo intra-base station handovers to a cell at the same base station, i.e. a synchronized cell. Both scenarios may introduce significant interference on a UE that maintains a connection with a degraded cell, such as interference from downlink data transmitted on the Physical Downlink Shared Channel (PDSCH) to UEs 104 and 106 imposed onto the cell-specific reference signal (CRS) of UE 102 and or interference imposed by the Physical Uplink Shared Channel (PUSCH) of UEs 104 and 106 onto the PUSCH of UE 102.

In recognition of the above-detailed problems associated with increased interference caused by UE migration from a degraded cell to another nearby cell, a victim UE may therefore be configured to avoid such situations by recognizing critical scenarios in which increased interference may occur. For example, a UE may be configured to predict and/or detect critical scenarios in which additional UEs may undergo handover from a degraded cell to a nearby cell. The UE may be able to identify (i.e. predict and/or detect) such critical scenarios before the existing radio link with the degraded cell has deteriorated to unacceptably low levels in which excessive handover latency (i.e. long duration of time until handover may be initiated and/or completed) or radio link failure are likely. Upon identification of a critical scenario, a UE may enact procedures designed to expedite a handover, i.e. procedures associated with a reduced expected handover latency, thereby potentially avoiding a situation in which the UE experiences excessive handover latency due to increased interference from the nearby cell. Due to the expedited handover, the UE may move to from the degraded cell to a nearby cell either before user operation experiences severe negative impacts or at an earlier time, thereby reducing the duration of time spent in poor radio link conditions.

It is appreciated that as the handover decision flow may be ultimately implemented by network (i.e. by network component such as a base station), a UE may not have full control over actual handover latency. However, a UE may be able to exercise a certain degree of control over handover latency through adjustment of measurement reporting configurations. It is appreciated that a UE may be able to potentially expedite or accelerate handover procedures by performing measurement reporting according to a measurement reporting configuration with a lower expected handover latency than a default measurement reporting configuration, i.e. a measurement reporting configuration with a lower expected duration of time until a handover is initiated and/or completed than the expected duration of time until a handover is initiated and/or completed of the default measurement reporting configuration. Measurement reporting configurations with low expected handover latency may be measurement reporting configurations that are biased towards earlier transmission of measurement reports and/or measurement reporting configurations that adjust measurement results in order to render a handover decision more probable. It is appreciated that while measurement reporting configurations may have low expected handover latency, the final handover decision is still enacted by the network, and accordingly there exists no guarantee that a handover will be initiated and/or completed. It is thus further appreciated that measurement reporting configurations may nevertheless reduce the expected amount of time until a handover is initiated and/or completed.

Handover in LTE networks is a mobility management procedure typically controlled by the network (e.g. primarily through the serving base station) for UEs in RRC_Connected mode. As detailed in the above scenario, a serving base station may render a decision to perform a handover based on measurement reports received from the UE. Accordingly, a UE may affect the timing of handover by modifying the procedures performed by the UE for measurement reporting, such as by adjusting parameters to trigger early transmission of measurement reports or by biasing the measurement results included in the measurement reports. These actions, collectively referred to herein as alternate measurement reporting protocols, may be effective in reducing the time to trigger a handover at the serving eNB. These alternate measurement reporting protocols may be associated with lower expected handover latency than certain default measurement reporting protocols, such as measurement reporting protocols provided by the network. Earlier handovers may therefore potentially be triggered through enactment of alternate measurement reporting protocols with lower expected handover latency than default measurement reporting protocols.

As previously detailed, a UE in RRC_Connected mode may receive an RRC Connection Reconfiguration message specifying a measurement reporting configuration. The UE may then perform cell measurements, such as Reference Signal Receive Power (RSRP) or Reference Signal Receive Quality (RSRQ), on a serving cell or one or more neighbor cells as specified in the RRC Connection Reconfiguration message. The UE may then provide the obtained measurement results to the serving cell in the form of a measurement reports according to the specified measurement reporting configuration. The serving cell may then dictate the mobility of the UE based on the received measurement reports, such as by performing a handover to a neighbor cell referenced in a measurement report.

The RRC Connection Reconfiguration message may specify a variety of parameters dictating the process by which a UE is to report measurement results. The measurement reporting configuration provided to the UE may typically include a listing of measurement objects, i.e. the frequencies and/or cells that the UE is to perform measurements on, and may further specify the type of measurement to be performed, such as an RSRP or RSRQ measurement. The measurement configuration may also specify measurement identifies, which may be used as reference to organize measurement objects according to measurement reporting configurations, and a measurement gap configuration for performing measurements on cells on different frequencies or different radio access technologies (if required).

The measurement reporting configuration may additionally specify whether the UE is to perform measurement reporting according to a periodic or an aperiodic measurement reporting scheme. A UE configured according to a periodic measurement reporting scheme may be instructed to send measurement reports according to a set period, such as e.g. sending a measurement report to the serving cell identifying the strongest nearby cells every several seconds.

Alternatively, a UE may be configured for aperiodic measurement reporting, which may also be referred to as event-triggered measurement reporting. A UE configured as such may transmit a measurement report when one or more obtained measurement results satisfy a certain criteria set, i.e. may "trigger" a measurement report according to an observed "event". There exist numerous such "events", each identified by an alphanumerical identifier such as A1, A2, ..., A6, B1, B2, etc.

Each reporting event is defined by a predefined criteria set, and the UE may thus be configured to transmit a measurement report to the UE when obtained measurement results satisfy the predefined criteria set associated with a reporting event. For example, reporting event A3 is defined as a scenario in which a neighbor cell measurement value exceeds a serving cell measurement value by a certain offset amount. If the UE obtains a neighbor cell measurement and serving cell measurement satisfying this criteria, the UE may accordingly transmit a measurement report to the serving cell containing the obtained measurement results. Similarly to reporting event A3, many of the specified reporting events involve comparisons of the serving cell measurements, neighbor cell measurements, and/or one or more thresholds.

Each of the reporting events may be thus associated with one or more offsets and/or thresholds, and may involve either one of or both of serving cell and neighbor cell measurements. The measurement reporting configuration may specify the parameters associated with each measurement event, such as threshold, offset, and hysteresis values. Furthermore, the measurement reporting configuration may specify timing criteria, such as a time-to-trigger (TTT) value. The TTT value may be used to further define the measurement events. For example, measurement event A3 may only be triggered if the neighbor cell measurement exceeds the serving cell measurement by a certain offset for a certain duration of time, where the duration of time is the TTT value. The neighbor cell and serving cell measurements may also be filtered, such as e.g. averaged or similar smoothing processing, the exact nature of which may be specified in the form of Layer 3 (L3) filtering parameters also specified in the measurement reporting configuration.

Accordingly, handovers may be predominately dependent on the measurement reporting configuration. For example, a UE in an event-triggered reporting configuration may not obtain any measurements satisfying the criteria for a reporting event, and accordingly may not send any measurement reports to the serving base station. As no measurement reports are received, the serving base station may not initiate any handover proceedings with the UE. A UE may be alternatively more likely or less likely to send event-triggered measurement reports based on the values of the specified threshold, offset, and/or hysteresis values, as it may be respectively likely or unlikely that any measurement results will satisfy the criteria for a reporting event. Consequently, an event-triggered measurement reporting configuration that is associated with a low likelihood of transmitting a measurement report (e.g. due to high thresholds, TTT values, etc.) may be associated with a relatively high expected measurement reporting latency, as it may be rare that a measurement result satisfies the criteria of the event-triggered measurement reporting configuration in order to trigger transmission of a measurement report. High expected measurement reporting latency may similarly be associated with high expected handover latency, as a base station implementing handover decision flow may not initiate a handover if no measurement reports are received.

A UE may therefore bias the handover procedures towards expedited handovers by modifying the parameters for event-triggered measurement reporting, thereby reducing expected handover latency. For example, handovers for event-triggered/aperiodic measurement reporting may be triggered relatively quickly if low values for offset, threshold, hysteresis, or TTT parameters are specified in the measurement reporting configuration. While these values are specified by the network and provided by the serving cell, a UE configured for event-triggered reporting may be able to prematurely bias a handover by modifying one or more of the event-trigger parameters, thereby reducing expected handover latency.

A UE may additionally be able to modify the actual measurement results in order to bias handover procedures towards quicker handover (i.e. lower expected handover latency), such as by reducing the reported measurement values of the serving cell and/or increasing the reported measurement values of one or more neighbor cells. The biasing of measurement reports may be available to a UEs configured according to either event-triggered or periodic measurement reporting schemes.

The adjustment of measurement reporting parameters and biasing of measurement results may be collectively referred to as alternate measurement reporting protocols. The alternate measurement reporting protocols may allow a UE to expedite handover proceedings, thereby enabling a UE to advance handover procedures with the intent to obtain an earlier handover as initiated by the serving base station. The UE may therefore complete a handover from a degraded cell to nearby cell at an earlier time.

Assuming a UE is able to identify a critical scenario associated with excessive handover latency caused by increased interference, the UE may subsequently also be able to bias the handover procedures towards a faster handover by engaging in alternate measurement reporting protocols, thereby reducing expected handover latency. A UE may be able to identify such critical scenarios based on measurements obtained during the process of measurement reporting, such as by monitoring signal power and/or signal quality measurements in order to predict and/or detect when an increased interference scenario is likely. It is appreciated that a UE may additionally need to complete measurements outside of those explicitly specified in the measurement reporting configuration, as one or more of the measurements needed to identify critical scenarios may not be included in the measurement reporting configuration.

In an exemplary aspect of the disclosure, a UE may be configured to identify at least three such critical scenarios. Upon identification (i.e. prediction and/or detection) of at least one of the critical scenarios, the UE may be configured to perform alternate measurement reporting protocols, such as adjusting event-triggering parameters or measurement results, in order to expedite handover from a degraded serving cell.

In a first critical scenario, a UE may determine that additional UEs have recently undergone handover to a nearby cell. The UE may therefore assume that increased interference may be subsequently experienced as a result of the newly established communication links between the additional UEs and the nearby cell. In reference to mobile communication system 100 as shown in FIG. 1, UE 102 may be able to detect the aforementioned condition by identifying signal indicators, such as e.g. signal-to-interference-plus-noise ratio, that indicate interference levels. UE 102 may determine that a large drop in SINR with the serving cell has occurred, which may be associated with a sudden increase in interference such as e.g. caused by the migration of additional UEs to a nearby cell. UE 102 may determine that the first critical scenario has occurred if the resulting final SINR of the serving cell is below a predefined threshold. The interference associated with additional UE migration from the degraded serving cell to a nearby cell may result in a high BLER for the UE, which may complicate handover proceedings.

In a second critical scenario, the UE may determine that the load of a neighbor cell is light and the signal strength of the neighbor cell is relatively compared to the signal strength of the serving cell. This scenario characterized by low load concurrent with high signal strength may indicate that the neighbor cell will introduce significant interference onto the UE if the neighbor cell becomes heavily loaded. The resulting interference may cause a high BLER for the UE, thereby preventing the UE from having reliable downlink reception from the serving cell during potential handover procedures. In relation to mobile communication network 100 of FIG. 1, UE 102 may determine that the second cell of eNB 112 has high signal strength compared to the current serving cell (i.e. the first cell) of eNB 110, such as by comparing the RSRP of the current serving cell with the RSRP of the second cell. UE 102 may additionally determine that the second cell of eNB 112 is lightly loaded, such as by measuring the RSRQ of the second cell. Upon identification of this critical scenario, UE 102 may enact alternate measurement reporting protocols in order to expedite handover.

In a third critical scenario, a UE may monitor a trend of one or more signal conditions of the serving cell and/or neighbor cells. For example, a UE may monitor serving cell RSRP in order to determine whether serving cell RSRP is decreasing in a consistent manner, which be associated with constant and rapid movement of the UE away from the serving cell. Accordingly, the UE may evaluate the slope of measured serving cell RSRP over time. Furthermore, the UE may additionally monitor the RSRP of neighbor cells in order to assess whether the RSRP of a neighbor cell is consistently increasing. In reference to mobile communication system 100 of FIG. 1, UE 102 may monitor the RSRP of the serving cell of eNB 110 in order to determine if the serving cell RSRP exhibits a consistently decreasing slope. UE 102 may also monitor the RSRP of one or more neighbor cells in order to determine if any of the neighbor cells exhibit a consistently increasing slope.

Upon identification of any of the critical scenarios identified above, UE 102 may initiate alternate measurement reporting protocols associated with lower expected handover latency than default measurement reporting protocols. As a result, UE 102 may bias the handover procedures towards earlier triggering of handover procedures, thereby potentially avoiding the negative impacts associated with attempting handover during increased interference situations. Excessive handover latency and the possibility of radio link failure may thus be reduced. It is appreciated that the included approaches may be implemented solely at the UE side, and accordingly further configuration of base stations or other network components may not be necessary.

Figure 2:
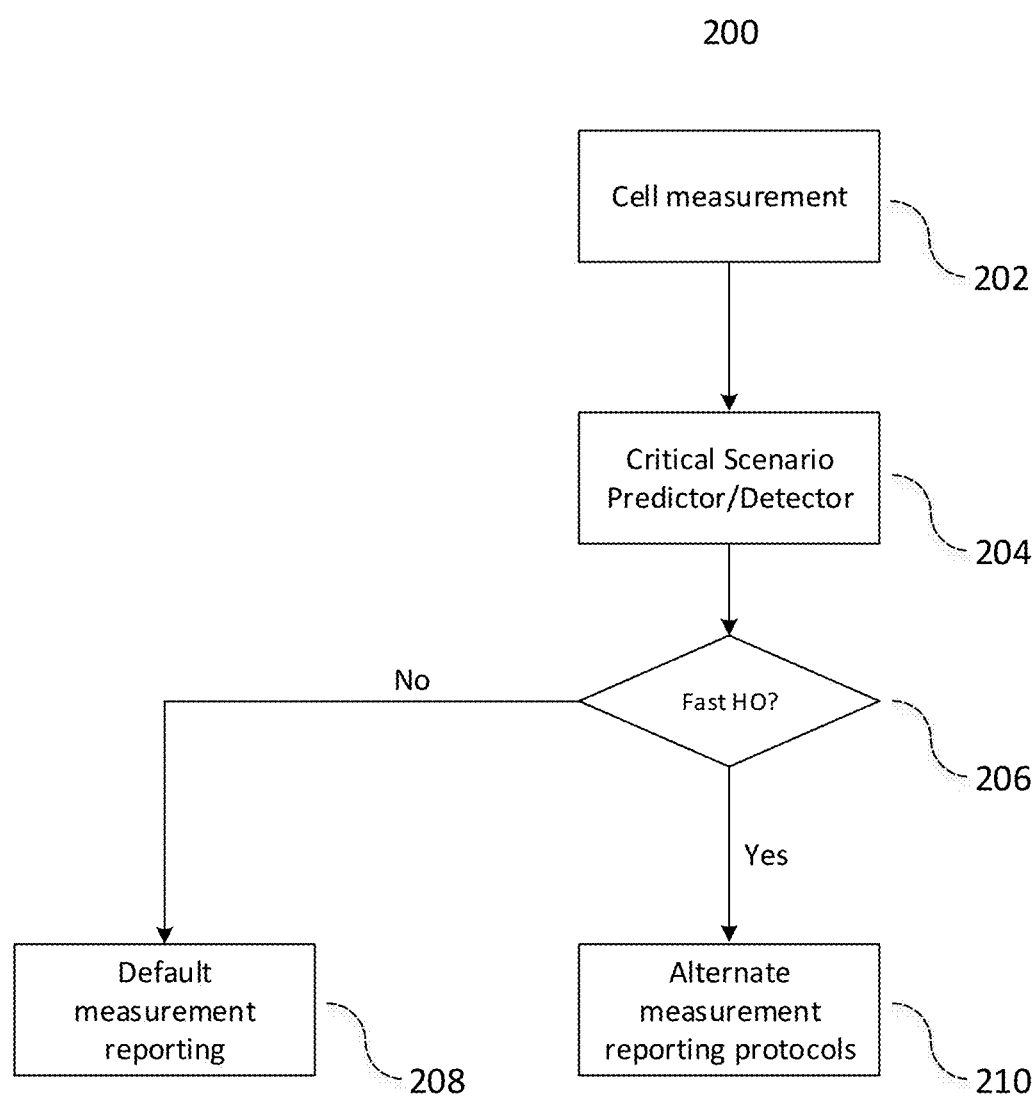
FIG. 2 shows a flow diagram illustrating a measurement reporting process for optional early triggering of handovers.

FIG. 2 shows a flow chart illustrating method 200. Method 200 may be implemented in order to identify a critical scenario where increased interference may lead to excessive handover latency. The interference increase may be associated with the handover of one or more additional UEs from the same serving cell as a UE to a nearby serving cell, thereby imposing additional interference on the radio link from the UE to the serving cell. As radio conditions degrade between the UE and the serving cell, the UE may be unable to maintain strong downlink reception with the serving cell, which may in turn severely affect handover procedures. Increased BLER caused by the additional interference may lead to long handover latency or even cause radio link failure, thereby disrupting a variety of user operations.

A UE may implement method 200 in order to monitor for one or more critical scenarios associated with increased interference. If a critical scenario is identified, the UE may engage in alternate measurement reporting protocols in order to expedite a handover to a nearby cell, thereby reducing expected handover latency and avoiding lengthy handover latency. The alternate measurement reporting protocols may include adjusting one or more measurement reporting parameters associated with event-triggered measurement reports or biasing reported measurement results that are transmitted back to the serving cell.

In 200, the UE may perform cell measurements. The cell measurements may be performed on the serving cell and one or more neighbor cells, and may involve measuring e.g. RSRP, RSRQ, Received Strength Signal Indication (RSSI) and/or SINR values of the associated cells. The cell measurements performed in 202 may be performed according to a measurement reporting configuration, such as a measurement reporting configuration specified in an RRC Connection Reconfiguration message received from the serving cell. The measurements may include further measurements not explicitly specified in the measurement reporting configuration, such as e.g. further measurements needed by the UE in order to monitor for and identify critical scenarios.

In 204, the measurements may be provided to a critical scenario predictor/detector, which may be able to predict or detect one or more critical scenarios associated with increased interference based on the provided measurements. The critical scenario predictor/detector may be implemented by one or more circuits or hardware components of the UE, such as e.g. integrated or processing circuitry. The critical scenario predictor/detector may analyze the measurement results in order to determine whether the measurement results are consistent with one or more critical scenarios. The critical scenario predictor/detector may additionally utilize one or more past measurement results in conjunction with the most recent measurement results obtained in 202.

The critical scenario predictor/detector may then render a decision as to whether any of the critical scenarios are predicted and/or detected based on the analysis of the measurement results in 206. If no critical scenarios are identified (i.e. predicted and/or detected), method 200 may proceed to 208, where default measurement reporting, i.e. according to the specified measurement reporting configuration, may be completed. The measurement results may accordingly be provided to a measurement report controller, which may be responsible for transmitting measurement reports according to the measurement reporting configuration. The measurement reporting controller may be implemented by one or more circuits or hardware components of the UE, such as e.g. integrated or processing circuitry. As the critical scenario predictor/detector has not identified any of the critical scenarios, the measurement report controller may transmit original (i.e. unaltered) measurement report results to the serving cell according to the specified measurement reporting configuration. For example, the measurement report controller may transmit a measurement report containing the measurement results from 202 according to a periodic or event-triggered measurement reporting configuration dependent on the reporting configuration specified in the RRC Connection Reconfiguration message. In an event-triggered measurement reporting configuration, the measurement report controller may determine whether the measurement results satisfy the criteria for one of the measurement events and transmit a measurement result accordingly. Alternatively, the measurement report controller may transmit a measurement report containing the measurement results consistent with the measurement reporting period for a period measurement reporting configuration.

Alternatively, the critical scenario predictor/detector may determine in 206 that a critical scenario has been detected based on the measurement results. Method 200 may thus proceed to 208 to perform alternate measurement reporting protocols in order to expedite handover procedures, i.e. to attempt to trigger an early handover by utilizing alternate measurement reporting protocols with reduced expected handover latency. For example, the alternate measurement reporting protocols in an event-triggered measurement reporting configuration may include adjusting one or more measurement reporting parameters, such as threshold values, offset values, hysteresis values, TTT values, or L3 filtering parameters. The measurement reporting parameters may be adjusted in order to bias event-triggering, thereby sending event-triggered measurement reports at an earlier time. Accordingly, this approach may result in a reduction in expected measurement reporting latency, thereby similarly reducing expected handover latency. The alternate measurement reporting protocols may additionally include biasing the measurement results, such as reducing the measurements results for the serving cell and increasing the measurement results for one or more neighbor cells, thereby biasing the network towards performing a handover due to the exaggerated quality of the neighbor cells (represented by the altered measurement results) relative to the serving cell. The alternate measurement reporting protocols for a UE configured according to a periodic measurement reporting configuration may additionally include biasing measurement results, as there may not exist any measurement reporting parameters to trigger quicker handovers.

The alternate measurement reporting protocols of 210 may also utilize the measurement report controller used for default measurement reporting in 208. However, the alternate measurement reporting protocols may include the measurement report controller adjusting one or more parameters, such as the event-triggered parameters. The measurement report controller may accordingly perform measurement reporting according to the modified parameters, which may lead to earlier triggering of measurement events. Additionally, the measurement report controller may bias the measurement results transmitted in the measurement reports to the serving base station, similarly leading to faster (i.e. earlier) handover procedures.

Figure 3:
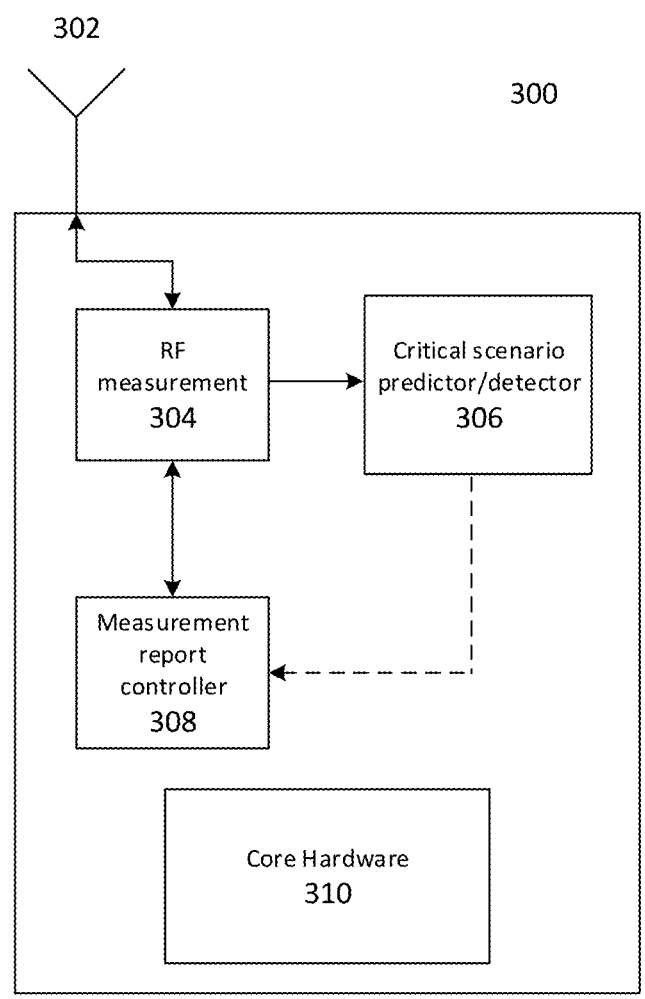
FIG. 3 shows various circuits and components of mobile communication terminal.

FIG. 3 shows UE 300 configured according an aspect of the disclosure. UE 300 may be configured to identify (i.e. predict and/or detect) one or more critical scenarios consistent with anticipated increased interference situations, such as an increased interference situation caused by the migration of additional UEs from a degraded serving cell to another nearby cell. UE 300 may be configured to trigger alternate measurement reporting protocols if a critical scenario is identified, and accordingly may undergo earlier handover in order to avoid significant impacts associated with attempting a handover in degraded radio link conditions.

UE 300 may include antenna 302, RF circuit 304, critical scenario predictor/detector 306, measurement report controller 308, and core hardware 310. The aforementioned circuitry and hardware may be implemented as separate circuits, e.g. as separate integrated circuits, as illustrated in FIG. 3. However, it is understood that some or all of the circuits may be implemented by a common programmable processor, such as e.g. a microprocessor. Accordingly, some or all of the functionality of the one or more of the aforementioned components may be consolidated into a single hardware component. It is also understood that UE 300 may include a number of additional components, including hardware, processors, memory, and other specialty or generic hardware/processors/circuits, etc., in order to support a variety of additional operations of wireless radio communications. UE 300 may also include a variety of user input/output devices such as displays, keypads, touchscreens, speakers, external buttons, etc.

Antenna 302 may be composed of a single antenna, or alternatively may be an antenna array composed of a plurality of antennas. Antenna 302 may receive wireless radio signals, such as e.g. mobile communication signals received over wireless air interfaces 120-128 from eNBs 110 and 112. Antenna 302 may transduce received wireless radio signals and provide resulting electrical radio frequency signals to RF circuit 304. RF circuit 304 may operate as an RF transceiver, and accordingly RF circuit 304 may be configured to demodulate and digitize the radio frequency signals received from antenna 302, such as e.g. by selecting a carrier frequency and performing analog to digital conversion of the radio frequency signal. RF circuit 304 may select a carrier frequency to receive radio frequency signals based on the carrier frequencies of channels of one or more cells, such as e.g. one or more cells located at eNBs 110-112, and accordingly may receive desired signals transmitted by the one or more transmitting cells.

RF circuit 304 may then provide received the resulting digitized signals to one or more components of UE 300, such as e.g. one or more processing circuits of core hardware 310 (connection not explicitly shown in FIG. 3). Core hardware 310 may then perform appropriate actions in response to the digitized signals, such as e.g. providing a user with voice data or other data information, performing cell measurements, monitoring for user input and/or other commands, or a variety of additional mobile communication operations. It is understood that such functionality of mobile terminals will be appreciated by those having skill in the art.

As previously detailed, RF circuit 310 may be configured to operate as an RF transceiver, and consequently may be further configured to perform wireless transmission of radio frequency signals, such as e.g. by receiving baseband signals intended for uplink transmission from other components of UE 300 such as core hardware 310, modulating the received baseband signals onto a radio carrier frequency, and wirelessly transmitting the resulting radio frequency radio signals using antenna 302. UE 300 may exchange data with one or more cells, such as e.g. cells located at eNBs 110 and 112 in this manner.

According to an aspect of the disclosure, RF circuit 304 may be responsible for performing measurements on received signals, and accordingly may be tasked with performing measurements according to measurement reporting procedures. UE 300 may receive an RRC Connection Reconfiguration message from e.g. eNB 110, which may be received and processed by antenna 302 and RF circuit 304. The RRC Connection Reconfiguration message may then be provided to measurement report controller 308, which may utilize the information contained in the RRC Connection Reconfiguration message in order to perform measurement reporting. The RRC Connection Reconfiguration message may additionally be provided to further components of core hardware 310, which may operate according to further information included in the RRC Connection Reconfiguration message.

As previously detailed, the RRC Connection Reconfiguration message may include a number of parameters related to measurement reporting, such as measurement event parameters (e.g. thresholds related to reporting events and specification of periodic or event-triggered measurement reporting), measurement quantity parameters (e.g. specifying the type of measurement, such as RSRP or RSRQ), offset and hysteresis parameters (e.g. as used in detecting reporting events), TTT parameters, L3 filtering parameters, etc.

The information contained in the RRC Connection Reconfiguration message may thus define the measurement reporting configuration to be used by UE 300. Measurement report controller 308 may perform measurements and measurement reporting according to the specified measurement reporting configuration.

As measurement reporting involves the measurement of signals received from one or more cells, measurement report controller 308 may utilize RF circuit 304 in order to measure the corresponding wireless signals. For example, measurement report controller 308 may utilize measurement objects specified by in the RRC Connection Reconfiguration message to identify frequencies and cell identities that are to be measured according to the specified measurement reporting configuration. Measurement report controller 308 may then control RF circuit 304 such that the appropriate signals, such as e.g. reference signals transmitted by the one or more cells identified as measurement objects, are measured.

RF circuit 304 may then perform the associated measurements as specified and/or controlled by measurement report controller 308, such as by tuning to an appropriate carrier frequency and measuring a characteristic of the received signal. For example, RF circuit 304 may receive a wireless signal containing a reference signal transmitted by the serving cell and perform a measurement thereon. RF circuit 304 may additionally receive wireless signals containing a reference signals transmitted by one or more neighbor cells and perform similar measurements thereon. For example, RF circuit 304 may measure the signal power of the reference signal, i.e. an RSRP measurement, and provide the resulting measurement result to measurement report controller 308. Similarly, RF circuit 304 may measure the signal quality of the reference signal, i.e. an RSRQ measurement, and provide the resulting measurement to measurement report controller 308. RF circuit 304 may be able to perform a number of additional measurements, such as e.g. Received Signal Strength Indication (which may e.g. be utilized to obtain an RSRQ measurement), SINR measurements, BLER measurements, etc.

Measurement report controller 308 may thus instruct RF circuit 304 to perform signal measurements consistent with the measurement reporting configuration. RF circuit 304 may then provide measurement report controller 308 with the measurement results. Measurement report controller 308 may then be responsible for compiling and transmitting measurement reports consistent with the specified measurement reporting configuration. For example, measurement report controller 308 may compile periodic measurement reports if configured in a periodic measurement reporting configuration and provide the measurement reports to RF circuit 304 for transmission to the serving cell. Measurement report controller 308 may also be responsible for monitoring the measurement results to determine whether the measurement results satisfy the criteria associated with a measurement reporting event if configured in an event-triggered measurement reporting configuration. Measurement report controller 308 may then compile and transmit an appropriate measurement report if the criteria for an eligible measurement reporting event are satisfied by the measurement results. Measurement report controller 308 may additionally include memory or buffering hardware components in order to store previous measurement results (not explicitly shown in FIG. 3).

As shown in FIG. 3, RF circuit 304 may additionally provide signal measurements to critical scenario predictor/detector 306. Critical scenario predictor/detector 306 may then monitor the signal measurements in order to identify (i.e. predict and/or detect) critical scenarios, i.e. scenarios where increased interference may lead to excessive handover latency and/or radio link failure. In addition to the measurements performed consistent with the measurement reporting configuration, RF circuit 304 may additionally perform the requisite measurements for critical scenario detection, which will be described in further detail with reference to the critical scenario conditions. Critical scenario predictor/detector 306 may additionally store previous signal measurements received from RF circuit 304, which may be necessary for detecting one or more of the critical scenarios.

In the event that critical scenario predictor/detector 306 identifies a critical scenario, critical scenario predictor/detector 306 may provide an indication to measurement report controller 308 that a critical scenario has been identified. Measurement report controller 308 may then initiate alternate measurement reporting protocols in order to expedite handover procedures, thereby potentially avoiding severe problems associated with attempting a handover in degraded radio conditions.

Critical scenario predictor/detector 306 may be configured to identify one or more critical scenarios based on cell measurement results. The first critical scenario may be associated with UE migration from a degraded serving cell to a nearby cell, thereby triggering an increase in observed interference between the UE and the degraded serving cell. Critical scenario predictor/detector 306 may detect the first critical scenario by monitoring SINR measurements of the serving cell. If a substantial drop in serving cell SINR is detected, critical scenario predictor/detector 306 may interpret the drop to be indicative of additional UE migration from the serving cell to a nearby cell, thereby causing a sudden increase in interference.

Figure 4:
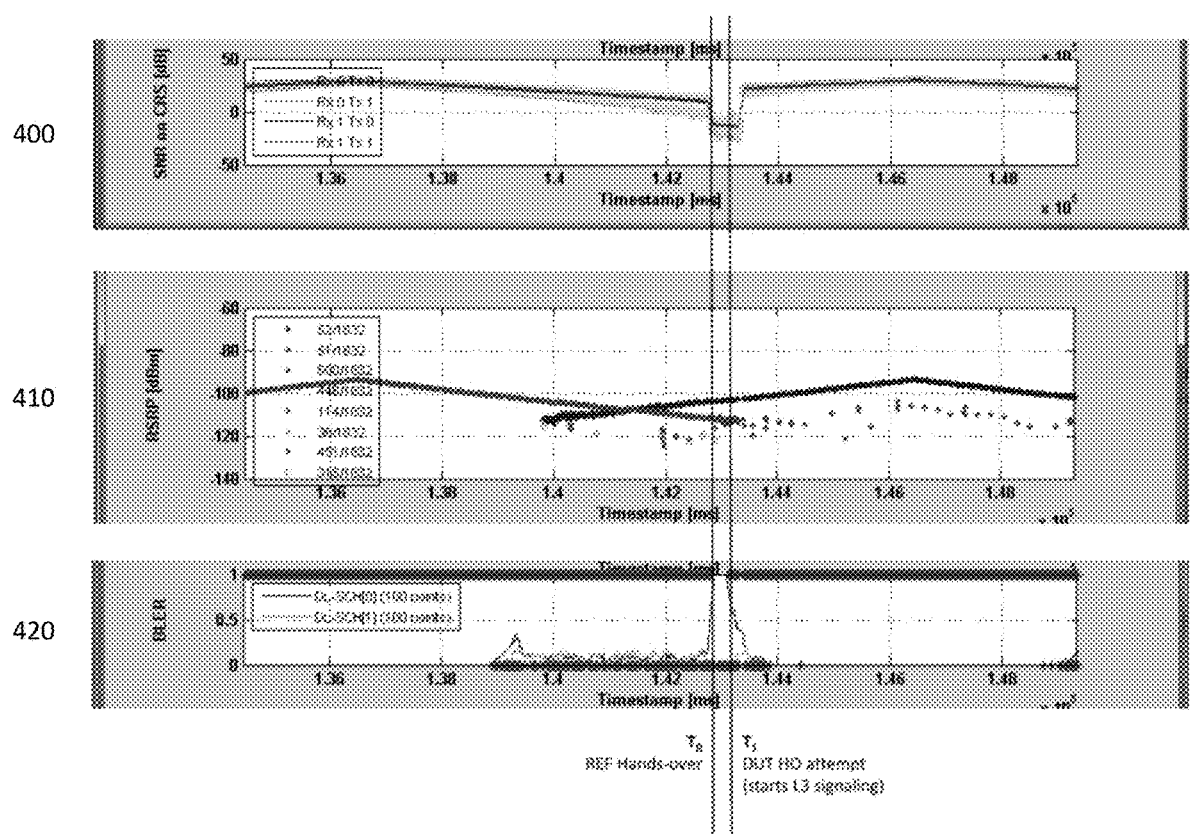
FIG. 4 shows exemplary results measurements associated with increased interference during handover procedures.

FIG. 4 shows plots 400-420 illustrating SINR, RSRP, and BLER curves related to the critical scenarios detailed herein.

Plot 400 shows plot of exemplary measured SINR values during an exemplary occurrence of the first critical scenario. The measured SINR values may thus be from the perspective of UE 300. As shown in plot FIG. 4, a further UE (denoted as REF in FIG. 4) may undergo handover at time $T_0$ from a first cell to a nearby cell. UE 300 (denoted as Device Under Test or DUT in FIG. 4) may be currently connected to the first cell as a serving cell. The handover event at time $T_0$ may thus cause a sudden drop in the measured serving cell SINR (based on them measurement cell specific reference signals) from the perspective of UE 300 as shown in plot 400.

Consequently, the first critical scenario involving migration of further UEs from the serving cell to a nearby cell may be detectable by monitoring SINR measurements of a serving cell. Cortical scenario predictor/detector 406 may thus monitor SINR measurements of the serving cell in order to detect significant drops in SINR. If a large drop in SINR is detected, such as shown in plot 400, critical scenario predictor/detector 306 may determine if the resulting SINR (i.e. measured SINR following the drop) falls below an SINR threshold. If the resulting SINR falls below the SINR threshold, critical scenario predictor/detector 306 may determine that the first critical scenario is occurring, and may trigger alternate measurement reporting protocols via measurement report controller 308.

Critical scenario predictor/detector 306 may be configured to detect the first critical scenario by monitoring SINR measurements of the serving cell according to Equation 1 and Equation 2 as follows:

$$SINR_{sc@t1} - SINR_{sc@t2} > TH_1 \quad (1),$$

$$SINR_{sc@t2} > TH_2 \quad (2),$$

where $SINR_{sc@t1}$ is the measured serving cell SINR at a first time $t_1$, $SINR_{sc@t2}$ is the measured serving cell SINR at a second time $t_2$, $TH_1$ is a first SINR threshold for detecting significant drops in SINR, and $TH_2$ is a second SINR threshold for determining the suitability of the resulting serving SINR after the drop.

Critical scenario predictor/detector 306 may thus utilize Equation 1 to determine if a change in measured serving cell SINR qualifies as an SINR drop consistent with the first critical scenario. The timing values $t_1$ and $t_2$ may correspond to $t_1 + t_{drop} = t_2$, where $t_{drop}$ is a selected parameter characterizing the duration of time associated with an SINR drop related to the first critical scenario. SINR threshold $TH_1$ may correspond to the level of drop in SINR associated with the first critical scenario. Accordingly, critical scenario predictor/detector 306 may be configured to identify SINR drops by detecting a drop in serving cell SINR over a set period of time where the magnitude of the drop is greater than a threshold. Critical scenario predictor/detector 306 may thus be configured to identify serving cell SINR variances that are sudden in time and substantive in degree or change as SINR drops consistent with the first critical scenario.

Critical scenario predictor/detector 306 may then compare the resulting serving cell SINR at time $t_2$ ($SINR_{sc@t1}$) to SINR threshold $TH_2$ to evaluate the resulting serving cell SINR level. If the serving cell SINR level remains sufficiently high (i.e. greater than $TH_2$), critical scenario predictor/detector 306 may determine that the first critical scenario is not occurring. However, if both Equation 1 and Equation 2 are satisfied, critical scenario predictor/detector 306 may determine that the first critical scenario is occurring, and may trigger alternate measurement reporting protocols by indicating to measurement report controller 308 that a critical scenario has been identified.

Critical scenario predictor/detector 306 may continuously monitor serving cell SINR measurements in order to determine if a set of serving cell SINR measurements satisfy Equation 1 and Equation 2. RF circuit 306 may perform the necessary measurements on signals received from the serving cell in order to produce the serving cell SINR measurements. The SINR measurements may be estimated based on reference signals, such as cell specific reference signals (CRS) received from the serving cell, or based on more complex methods, such as serving cell CRS in conjunction with neighboring cell information.

The second critical scenario may be associated with strong signal strength of a nearby cell relative to the signal strength of the serving cell concurrent with light loading of the nearby cell. Accordingly, a nearby cell with high signal power compared to serving cell may contribute significant interference on the radio link between UE 300 and the serving cell if the nearby cell becomes heavily loaded.

Critical scenario predictor/detector 306 may utilize RSRP measurements for the serving cell and a nearby cell, an RSRQ measurement of the nearby cell, and several thresholds in order to predict occurrence of the second critical scenario. Critical scenario predictor/detector 306 may monitor the corresponding measurements in order to predict the second critical scenario in accordance with Equation 3 and Equation 4 as follows:

$$RSRP_{sc} - RSRP_{nc} < TH_3 \quad (3),$$

$$RSRQ_{nc} > TH_4 \quad (4),$$

where $RSRP_{sc}$ is the measured RSRP of the serving cell, $RSRP_{nc}$ is the measured RSRP of a neighbor cell, $TH_3$ is an RSRP threshold, $RSRQ_{nc}$ is the measured RSRQ of the neighbor cell, and $TH_4$ is an RSRQ threshold.

Equation 3 therefore indicates that the serving cell signal strength (RSRP) is becoming weak compared to the neighbor cell, as the neighbor cell RSRQ exceeds the serving cell RSRQ by a threshold. Equation 4 indicates that the neighbor cell is lightly loaded, as the signal quality (RSRQ) is still above a threshold. Accordingly, the neighbor cell will introduce significant interference on the UE once the neighbor cell becomes heavily loaded, as the UE will remain on the serving cell with low signal strength. Accordingly, the neighbor cell will become heavily loaded if additional UEs migrate to the neighbor cell, thereby introducing high BLER onto the radio link between the UE and the serving cell. The increased BLER may in turn lead to high handover delays and may even require cell-reestablishment following radio link failure thereby further delaying handover procedures. The associated handover latencies may up to several seconds in duration, which may degrade user experience.

It is appreciated that SINR, RSRQ, and RSRQ values in Equations 1-4 may be filtered values, such as by L3 filtering as specified in the relevant 3GPP standards. Accordingly, the SINR, RSRQ, and RSRQ values may be averaged over time in order to reflect signal conditions over a period of time. Additionally, the thresholds $TH_1$, $TH_2$, $TH_3$, and $TH_4$ may be selected appropriately in order to make critical scenario detection more or less likely.

Critical scenario predictor/detector 306 may monitor serving cell and neighbor cell measurement results to determine if a set of performed measurement results satisfies both Equation 3 and Equation 4. If the associated equations are satisfied, critical scenario predictor/detector 306 may signal measurement report controller 308 to trigger alternate measurement reporting protocols to expedite handover proceedings.

The third critical scenario may involve determination of trends in key signal measurement metrics of the serving cell and/or neighbor cells, which may indicate a decrease in serving cell radio link quality coinciding with an increase in neighbor cell radio link quality. Critical scenario predictor/detector 306 may additionally monitor a series of serving cell and/or neighbor cells measurements, such as e.g. RSRP, to determine whether the serving cell RSRP is constantly decreasing and/or a neighbor cell RSRP is constantly increasing. Critical scenario predictor/detector 306 may be configured to predict the third critical scenario by monitoring serving cell RSRP measurements and neighbor cell RSRP measurements (or e.g. RSRQ measurements). Critical scenario predictor/detector 306 may trigger alternate measurement reporting protocols to initiate fast handover upon determining that serving cell measurement metrics are consistently decreasing. Critical scenario predictor/detector 306 may alternatively be configured to trigger alternate measurement reporting protocols upon determining that that serving cell measurement metrics are consistently decreasing simultaneous to neighbor cell measurement metrics consistently increasing.

Figure 5:
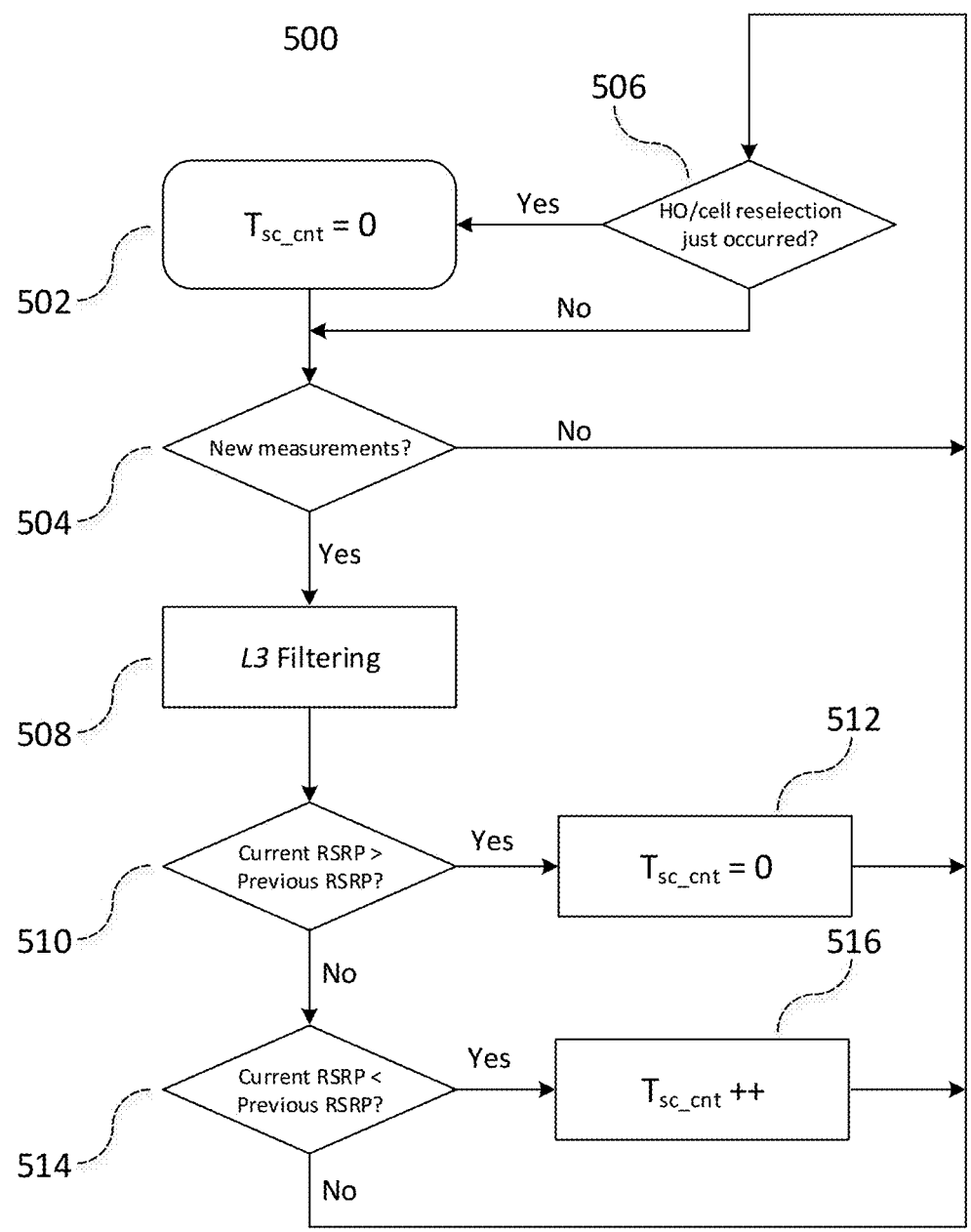
FIG. 5 shows a flow diagram illustrating a process for monitoring measurement trends for serving cell measurements.

FIG. 5 shows an exemplary implementation of serving cell trend detection method 500 for signal measurements of a serving cell. Critical scenario predictor/detector 306 may utilize such trend detection to predict the third critical scenario.

Critical scenario predictor/detector 306 may be configured to monitor the trend of RSRP measurements of a serving cell through the use of a count value $T_{sc\_cnt}$. $T_{sc\_cnt}$ may be used to count the number of consecutive serving cell RSRP measurements that are decreasing, i.e. the number of consecutive serving cell RSRP measurements that are less than the preceding serving cell RSRP measurement.

$T_{sc\_cnt}$ may be initialized as $T_{sc\_cnt}=0$ in 502 of serving cell trend detection method 500. Serving cell trend detection method 500 may proceed to 504 to determine whether new measurements have been obtained, such as e.g. signal measurements performed by RF circuit 304 as specified by measurement report controller 308 according to the current measurement reporting configuration. The new measurements may include e.g. serving cell and neighbor cell RSRP measurements, which may be used later by serving cell trend detection method 500 to identify trends in the RSRP measurements. If no new measurements have been obtained in 504, serving cell trend detection method 500 may proceed to 506 to determine if handover or cell reselection has just occurred. If handover or cell reselection has just occurred, serving cell trend detection method 500 may return to 502 to re-set $T_{sc\_cnt}$ to zero and re-enter the trend monitoring loop.

If new measurements have been obtained in 504, 508 may perform L3 filtering on the obtained measurements. L3 filtering may include filtering, smoothing, and/or averaging according to L3 filtering parameters specified in by the RRC Connection Reconfiguration message.

After L3 filtering, serving cell trend detection method 500 may proceed to 510 to determine whether the current serving cell RSRP measurement of the measurements of 504 is greater than the previous serving cell RSRP measurement. If 510 determines that the current serving cell RSRP measurement is greater than the previous serving cell RSRP measurement, serving cell trend detection method 500 may determine that there is no consistent negative slope in the serving cell RSRP. Serving cell trend detection method 500 may then set $T_{sc\_cnt}$ to $T_{sc\_cnt}=0$ in 512 and return to 506 to determine if handover or cell reselection has recently occurred.

If the current serving cell RSRP is not greater than the previous serving cell RSRP, serving cell trend detection method 500 may proceed to 514 to determine if the serving cell RSRP is less than the previous serving cell RSRP. If the current serving cell RSRP is less than the previous serving cell RSRP, serving cell trend detection method 500 may increment $T_{sc\_cnt}$ in 516 in order to reflect that a negative or decreasing trend has been observed in serving cell RSRP. After appropriately incrementing $T_{sc\_cnt}$, serving cell trend detection method 500 may proceed to 506 to check for recent handovers or cell reselection. If the UE has undergone a recent handover or cell reselection, the trend count indicated by $T_{sc\_cnt}$ may no longer be relevant, as trend count $T_{sc\_cnt}$ is intended to only reflect trends in the current serving cell. Serving cell trend detection method 500 may therefore re-set $T_{sc\_cnt}$ to zero and re-start serving cell trend detection method 500 to potentially identify serving cell trends for the new serving cell.

Alternatively, if the current serving cell RSRP is not greater than the previous serving cell RSRP in 514, serving cell trend detection method 500 may return to 506 to check for handovers and cell reselection without incrementing $T_{sc\_cnt}$. This path of serving cell trend detection method 500 may be taken if e.g. the current serving cell RSRP is equal to the previous serving cell RSRP, i.e. no change from the previous RSRP value to the current RSRP value. Serving cell trend detection method 500 may thus hold $T_{sc\_cnt}$ constant, and re-start the measurement monitoring loop of serving cell trend detection method 500. In an exemplary aspect of the disclosure, 514 may utilize a threshold $TH_3$ to determine if the current serving cell RSRP is substantially equal to the previous RSRP, such as by determining if $|RSRP_{sc\_current}-RSRP_{sc\_previous}|<TH_5$. Accordingly, if the current serving cell RSRP measurement $RSRP_{sc\_current}$ is within the previous serving cell RSRP measurement $RSRP_{sc\_previous}$ by threshold $TH_5$, serving cell trend detection method 500 may determine that the current serving cell RSRP is substantially unchanged from the previous serving cell RSRP, and serving cell trend detection method 500 should proceed to monitor further measurements without adjusting $T_{sc\_cnt}$. Threshold $TH_5$ may therefore be used as e.g. a tolerance threshold for determining equivalence.

Serving cell trend detection method 500 may therefore increment serving cell trend count if a serving cell RSRP measurement is less than the previous serving cell RSRP measurement. Serving cell trend detection method 500 may constantly monitor $T_{sc\_cnt}$ to determine if $T_{sc\_cnt}$ exceeds a threshold, such as prior to or following handover and cell reselection checking in 506. If $T_{sc\_cnt}$ exceeds the threshold, serving cell trend detection method 500 may identify the third critical scenario, as the serving cell RSRP has consistently decreased over a certain set of measurements. Critical scenario predictor/detector 306 may thus trigger alternate measurement reporting protocols upon determining that $T_{sc\_cnt}$ exceeds the serving cell RSRP trend threshold. It is appreciated that serving cell trend detection method 500 may be applied to further signal measurement characteristics, such as to detect trends in serving cell RSRQ, SINR, RSSI, etc.

In a further aspect of the disclosure, critical scenario predictor/detector 306 may simultaneously monitor RSRP measurements of one or more neighbor cells to determine whether a neighbor cell is experiencing an upward trend in RSRP measurements. Critical scenario predictor/detector 306 may then be configured to trigger alternate measurement reporting protocols if both the serving cell RSRP measurements exhibit a decreasing trend and the neighbor cell RSRP measurements exhibit an increasing trend.

Figure 6:
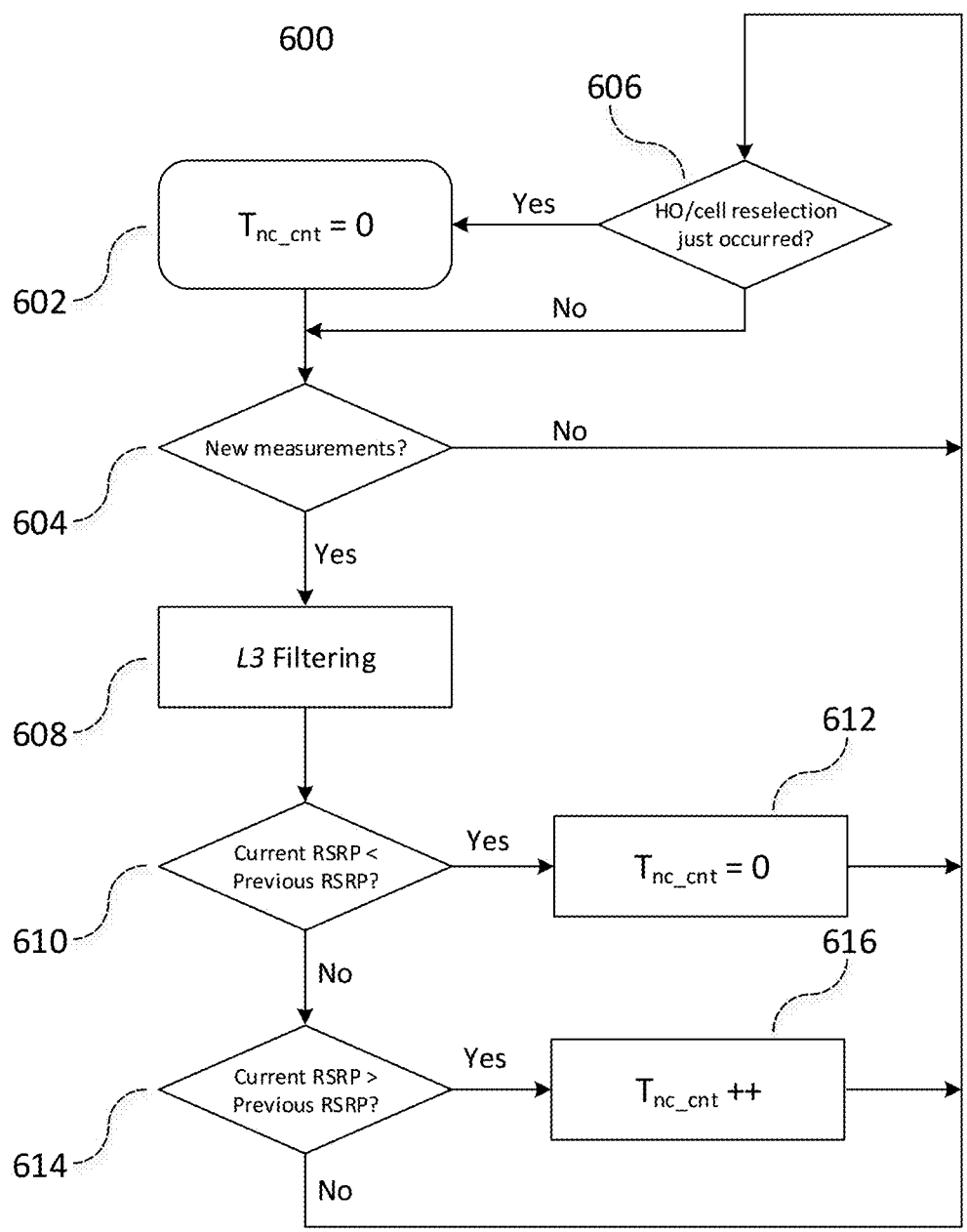
FIG. 6 shows a flow diagram illustrating a process for monitoring measurement trends for neighbor cell measurements.

Critical scenario predictor/detector 306 may implement trend detection of neighbor cell RSRP measurements in a similar manner as to serving cell trend detection method 500. For example, critical scenario predictor/detector 306 may be configured to perform neighbor cell trend detection method 600 as shown in FIG. 6.

Neighbor cell trend detection method 600 may execute 602-616 in substantially the same manner as corresponding 502-516 of serving cell trend detection method 500. Neighbor cell trend detection method 600 may update and monitor neighbor cell trend count $T_{nc\_cnt}$, i.e. by determining if new neighbor cell RSRP measurements identified in 604 exceed previous neighbor cell RSRP measurements. In contrast to serving cell trend count $T_{sc\_cnt}$, neighbor cell trend count $T_{nc\_cnt}$ may be incremented in 616 if the current neighbor cell RSRP measurement exceeds the previous neighbor cell RSRP measurement in 614. Accordingly, neighbor cell trend detection method 600 may be utilized by critical scenario predictor/detector 306 to identify positive trends in neighbor cell RSRP measurements.

Critical scenario predictor/detector 306 may thus monitor both serving cell trend count $T_{sc\_cnt}$ and neighbor cell trend count $T_{nc\_cnt}$ relative to serving cell count threshold $TH_{sc\_cnt}$ and neighbor cell count threshold $TH_{nc\_cnt}$. If both serving cell trend count $T_{sc\_cnt}$ and neighbor cell trend count $T_{nc\_cnt}$ exceed respective count thresholds $TH_{sc\_cnt}$ and $TH_{nc\_cnt}$, critical scenario predictor/detector 306 may predict that the third critical scenario is occurring and trigger alternate measurement reporting protocols in response thereto. Critical scenario predictor/detector 306 may perform this comparison prior to or following 506 and 606 in serving cell trend detection method 500 and neighbor cell trend detection method 600, respectively, in order to consistently monitor serving cell and neighbor cell measurement trends.

It is appreciated that critical scenario predictor/detector 306 may execute neighbor cell trend detection method 600 for more than one neighbor cell at a time, such as for each neighbor cell being reported according to the measurement objects specified in the RRC Connection Reconfiguration message. Accordingly, critical scenario predictor/detector 306 may maintain several neighbor cell trend counts $T_{nc\_cnt1}, \ldots, T_{nc\_cntn}$ through the use of several neighbor cell trend detection loops in order to monitor a signal metric trends for a plurality of neighbor cells. If any of the neighbor cell trend counts exceed the corresponding neighbor cell trend count threshold and the serving cell trend count exceeds the corresponding serving cell trend count threshold, critical scenario predictor/detector 306 may initiate alternate measurement reporting protocols triggered by prediction of the third critical scenario.

It is further appreciated that serving cell trend count threshold $TH_{sc\_cnt}$ and neighbor cell trend count threshold $TH_{nc\_cnt}$ may be selected such that long-duration trends are required to trigger identification of the third critical scenario and/or such that either the serving cell measurements or neighbor cell measurements must exhibit a longer duration trend in order to trigger identification of the third critical scenario.

In a further aspect of the disclosure, critical scenario predictor/detector 306 may utilize slope/trend steepness in order to tune the triggering speed of expedited handover associated with the alternate measurement reporting protocols. For example, detection of steeper slopes in either serving cell or neighbor cell measurement trends may prompt alternate measurement reporting protocols to further expedite handovers, such as by further adjusting measurement reporting parameters to result in earlier event-triggering or by further biasing measurement reports to lead the serving base station to trigger an earlier handover. For example, a further counter per serving cell and neighbor cell being monitored may utilized to monitor the total change in RSRP over the duration of the increasing/decreasing trend. The further counter may be set to 0 during 502 and 602 concurrent with the reset of $T_{sc\_cnt}$ and $T_{nc\_cnt}$ to zero in serving cell trend detection method 500 and neighbor cell trend detection method 600. Critical scenario predictor/detector 306 may thus evaluate the further counter to determine if the overall RSRP change during the duration of the currently observed trend exceeds a further threshold and trigger alternate measurement reporting protocols accordingly.

In a further aspect of the disclosure, the filtering response of the L3 filters of 508 and 608 may be adapted to be robust against fading but sensitive to path loss.

In a further aspect of the disclosure, the measurement report period specified in the measurement reporting configuration may be considered as an additional factor to increase or reduce threshold values.

Shown below is an exemplary pseudocode implementation of alternate measurement reporting protocols regarding the third critical scenario. The below example may monitor both trends in serving cell measurements and neighbor cell measurements, and may utilize relaxation of event-triggered measurement reporting parameters in order expedite handover (as opposed to e.g. biasing measurement results).

| Handover Conditions |
| --- |
| //set A3 handover offset value |
| $A3_{HO\_offset} = O_{fp} + O_{cp} + O_{ff} - (O_{fn} - O_{cn} + Hys);$ |
| if $((T_{sc_{cnt}} \geq TH_{sc_{cnt}})$ and $(T_{nc\_cnt} \geq TH_{nc_{cnt}}))$ { |
|     //modify event-triggered measurement reporting parameters |
|     if $(RSRP_{nc} - RSRP_{sc} \geq A3_{HO\_offset}/M$ dB){ |
|         $TTT = TTT_{network}/N$ ms; |
|         StartTTTMeasure; |
|     } |
| } |
| else { |
|     //keep original event-triggered measurement reporting parameters |
|     if $(RSRP_{nc} - RSRP_{sc} \geq A3_{HO\_offset}$ dB){ |
|         $TTT = TTT_{network}$ ms; |
|         StartTTTMeasure; |
|     } |
| } |

In the above example, the offset used for the A3 event $A3_{HO\_offset}$ is initialized based on $O_{fn}$ (frequency specific offset of the frequency of the neighbor cell), $O_{cn}$ (cell-specific offset of the neighbor cell), $O_{fp}$ (frequency specific offset of the frequency of the serving cell), $O_{cp}$ (cell-specific offset of the serving cell), Hys (hysteresis parameter for A3 event), and $O_{ff}$ (offset parameter for A3 event), which may be provided in the measurement reporting configuration provided by the network (e.g. in the RRC Connection Reconfiguration message).

Critical scenario predictor/detector 306 may therefore monitor the serving cell and neighbor cell trend counts $T_{sc\_cnt}$ and $T_{sc\_cnt}$ in order to determine if both $T_{sc\_cnt}$ and $T_{nc\_cnt}$ exceed respective thresholds $TH_{sc\_cnt}$ and $TH_{nc\_cnt}$. If thresholds $TH_{sc\_cnt}$ and $TH_{nc\_cnt}$ are not satisfied, normal measurement reporting protocols are performed according to the default network-provided parameters $A3_{HO\_offset}$ and $TTT_{network}$. Alternatively, if thresholds $TH_{sc\_cnt}$ and $TH_{nc\_cnt}$ are satisfied by trend counts $T_{sc\_cnt}$ and $T_{sc\_cnt}$, measurement reports are performed according to $A3_{HO\_offset}/M$ and $TTT_{network}/N$, where the parameters M and N are utilized to adjust the event-triggered measurement reporting parameters in order to expedite handover. In a default implementation, M may be set to M=2 and N may be set to N=4. Accordingly, serving cell-neighbor cell offset value $A3_{HO\_offset}$ and time-to-trigger for event-triggering value $TTT_{network}$ may both be reduced according to M and N, respectively, thereby biasing measurement reporting towards transmitting an event-triggered measurement report.

Plot 410 of FIG. 4 illustrates an exemplary scenario where critical scenario predictor/detector may identify the third critical scenario. As shown in plot 410, serving cell RSRP measurements may exhibit a constant decreasing trend. Critical scenario predictor/detector 306 may utilize serving cell trend detection loop 500 to monitor serving cell RSRP measurements, and accordingly may identify a constant decrease in the serving cell RSRP measurements. Simultaneously, RSRP measurements for a neighbor cell may be constantly increasing, as illustrated in plot 410. Critical scenario predictor/detector 306 may accordingly detect the neighbor cell positive trend by monitoring one or more neighbor cells (including the neighbor cell exhibiting the positive RSRP trend) using one or more neighbor cell trend detection loops 600. Critical scenario predictor/detector 306 may therefore detect the negative serving cell RSRP trend and the positive neighbor cell RSRP trend by comparing the serving cell and neighbor cell trend counts to the respective thresholds, thereby identifying the third critical scenario.

A UE such as UE 300 may therefore be provided with critical scenario predictor/detector 306 in order to monitor for the occurrence of one or more critical scenarios, as detailed above. It is appreciated that critical scenario predictor/detector 306 may be configured to monitor for further critical scenarios in addition to the three critical scenario explicitly detailed herein. Upon identification (i.e. prediction or detection) of one of the critical scenarios, critical scenario predictor/detector 306 may trigger alternate measurement reporting protocols in order to trigger early (i.e. expedited) handover, such as by providing an indication to a measurement report controller such as measurement report controller 308 that early handover is desired.

As previously detailed, early handover may be obtained by performing alternate measurement reporting protocols such as adjustment of parameters for event-triggered measurement reporting or by biasing measurement results contained in the measurement report. Early handover may be triggered through adjustment of event-triggered measurement reporting parameters by relaxing the corresponding event-triggered measurement reporting parameters, such as reducing TTT, reducing offset values, reducing hysteresis values, adjusting L3 filtering parameters, and/or reducing threshold values. Early handover may similarly be triggered through biasing of measurement results by reducing serving cell measurement values and increasing neighbor cell measurement values. It is appreciated that either one of event-triggered measurement report parameter relaxation and measurement result biasing or both of may event-triggered measurement report parameter relaxation and measurement result biasing be used to expedite handover. As measurement reporting configurations involving solely periodic measurement reporting may not utilize event-triggered measurement reporting parameters, a UE configured to only transmit periodic measurement reports may be limited to measurement report biasing in order to decrease handover latency Measurement report controller 308 may therefore adjust event-triggered measurement reporting parameters or bias measurement results (i.e. perform alternate measurement reporting protocols to expedite handover) upon receiving an indication from critical scenario predictor/detector 306 that a critical scenario has been detected.

UE 300 may therefore be able to undergo early handover, as UE 300 may send measurement reports to the serving base station at an earlier time (i.e. caused by relaxing of event-triggered measurement reporting parameters) and/or may send measurement reports to the serving base station with measurement results biased in favor of handover (i.e. caused by adjustment of serving cell and/or neighbor cell measurement results). The serving base station may therefore receive measurement reports at an earlier time and/or may receive measurement results in the measurement report that bias a handover decision towards performing a handover (e.g. due to the poor serving cell measurement results and/or strong neighbor cell measurement results). UE 300 may therefore be instructed to undergo handover at an earlier time if alternate measurement reporting protocols are executed.

UE 300 may therefore avoid attempted handovers in high BLER conditions, such as high BLER conditions caused by increased interference from neighbor cells. An exemplary scenario is shown in plot 420 of FIG. 4. The BLER experienced by UE 300 may drop, such as caused by handover of a nearby UE from the serving cell of UE 300 to a nearby serving cell, as shown in plot 400. Accordingly, a subsequent handover attempted by UE 300 may take place in high BLER conditions, thereby sufficiently complicating the handover process. The handover process may therefore require long duration of time to complete (i.e. excessive handover latency) or even include radio link failure followed by required re-establishment procedures, which may further delay handover. A user may thus see low quality of surface during the attempted handover procedures in high BLER conditions, thereby degrading user experience.

As the critical scenarios detailed herein are designed to preemptively identify scenarios that may result in high BLER conditions, UE 300 may be able to avoid such scenarios by triggering alternate measurement reporting protocols. UE 300 may thus be able to trigger expedited handovers, thereby allowing UE 300 to attempt handover in stronger BLER conditions before BLER increases associated with a critical scenario occur.

It is appreciated that the exemplary implementations detailed above may involve UE 300 initiating alternate measurement reporting protocols if any one of the critical scenarios are identified (i.e. predicted or detected). UE 300 may be additionally configured to initiate alternate measurement reporting protocols only if e.g. a plurality of the critical scenarios are identified. In other words, UE 300 may be require that two or more of the critical scenarios be identified (i.e. occurring simultaneously) before initiating alternate measurement reporting protocols. UE 300 may alternatively be configured to initiate alternate measurement reporting protocols only if e.g. all of the critical scenarios are identified (i.e. occurring simultaneously).

In a further exemplary situation, UE 300 may have already initiated event-triggered measurement reporting, i.e. UE 300 may have already determined that measurement results satisfy the criteria for one or more event-triggered measurement report events and may have subsequently begun sending measurement reports to the serving cell. UE 300 may then identify a critical scenario. UE 300 in this situation may still initiate alternate measurement reporting protocols, i.e. may reduce event-triggered measurement reporting parameters for use in future measurement reports or may begin biasing measurement results in future measurement reports. UE 300 may therefore complete handover as soon as possible.

Figure 7:
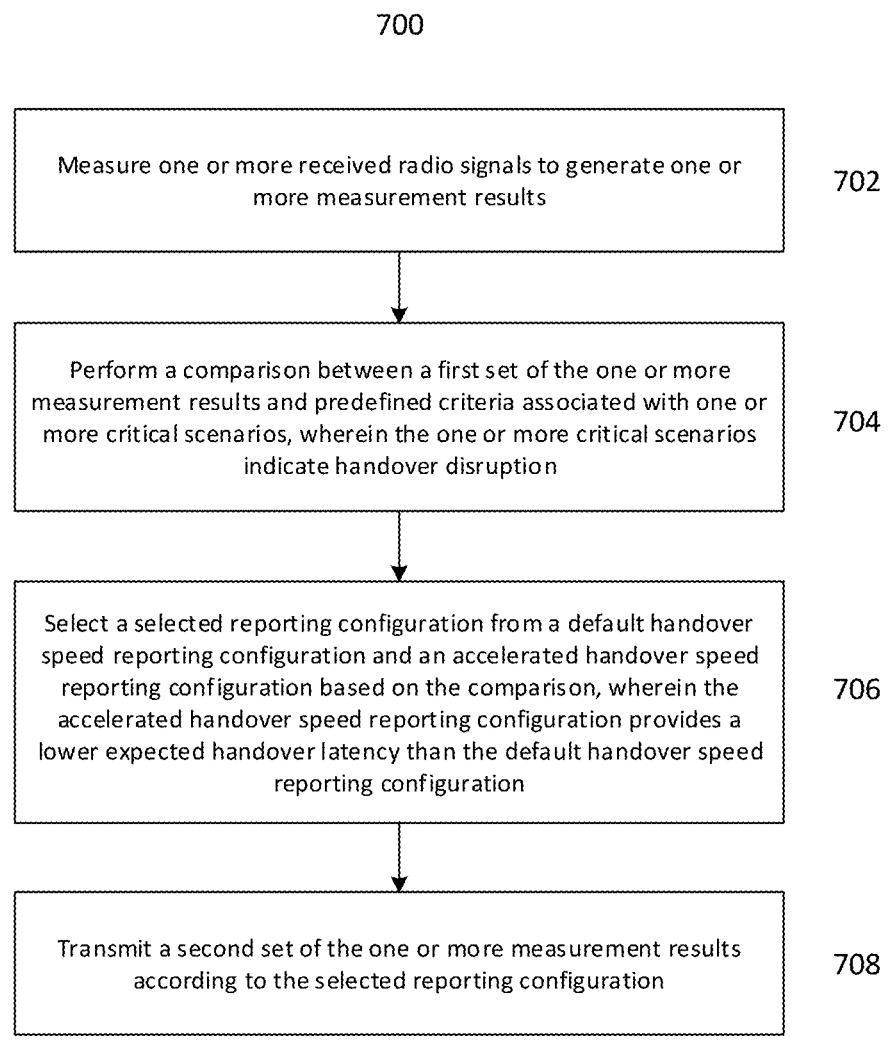
FIG. 7 shows a method for processing one or more received radio signals.

FIG. 7 shows a flow chart illustrating method 700 for processing one or more received radio signals according to an aspect of the disclosure. It is appreciated that method 700 may implemented in a mobile terminal such as e.g. UE 300.

Method 700 may measure one or more received radio signals to generate one or more measurement results in 702. Method 700 may receive the one or more received radio signals from one or more cells in a cellular communication network, such as a serving cell and one or more neighbor cells. The one or more measurement results may be measurement results of any number of signal characteristics, such as RSRP measurements, RSRQ measurements, or SINR measurements. Method 700 may measure the one or more received radio signals in 702 according to a default handover speed reporting configuration, such as e.g. a measurement reporting configuration provided by the serving cell.

Method 700 may then perform a comparison between a first set of the one or more measurement results and predefined criteria associated with one or more critical scenarios in 704, wherein the one or more critical scenarios may indicate handover disruption. Method 700 may therefore compare measurement results to the criteria associated with one or more critical scenarios, such as the three critical scenarios detailed above. Accordingly, 704 may involve comparing RSRP, RSRQ, and/or SINR measurements of the serving cell and one or more neighbor cells to predefined RSRP, RSRQ, and/or SINR thresholds associated with each of the three critical scenarios. 704 may therefore determine whether or not the measurement results meet the predefined criteria of one or more of the critical scenarios.

Method 700 may then select a selected reporting configuration to in 706. Method 700 may select the selected reporting configuration in order to determine the procedure by which transmission of a measurement report containing one or more of the measurement results should be performed. Accordingly, method 700 may select a default handover speed reporting configuration or an accelerated handover speed reporting configuration as the selected reporting configuration based on the comparison performed in 704, where the accelerated handover speed reporting configuration provides a lower expected handover latency than the default handover speed reporting configuration. Expected handover latency may be the expected time until a handover is initiated, and accordingly a low expected handover latency may be associated with a handover being initiated and/or completed at an earlier (i.e. sooner) time than a high expected handover latency. The default handover speed reporting configuration may be a measurement reporting configuration received from a serving cell. The accelerated handover speed reporting configuration may be determined by modifying one or more aspects of the default handover speed reporting configuration to reduce handover latency, such as by adjusting an event-triggered measurement report parameter or by biasing one or more of the measurement results.

Method 700 may then transmit a second set of the one or more measurement results according to the selected reporting configuration in 708. Transmitting the second set of the one or more measurement results according to the default handover speed reporting configuration may include transmitting the second set of the one or more measurement results according to the event-triggered measurement reporting parameters provided by the serving cell. Transmitting the second set of the one or more measurement results according to accelerated default handover speed reporting configuration may include adjusting one or more measurement results of the second set of the one or more measurement results, such as e.g. by increasing measurement results associated with a neighbor cell (e.g. increasing neighbor cell RSRP, RSRQ, and/or RSSI measurement results) or by decreasing measurement results associated with a serving cell (e.g. decreasing serving cell RSRP, RSRQ, and/or RSSI measurement results). Transmitting the second set of the one or more measurement results according to accelerated default handover speed reporting configuration may additionally or alternatively include adjusting an event-triggered measurement reporting parameter, such as e.g. adjusting an event-triggered measurement reporting parameter specified by the serving cell in the default handover speed reporting configuration, such that an expected measurement reporting latency is reduced. Accordingly, method 708 may perform actual transmission of the measurement result at an earlier time, thereby potentially reducing handover latency and avoiding handover disruption.

A mobile terminal device according to an aspect of this disclosure, e.g. UE 300, may include a measurement circuit (e.g. RF circuit 304), a critical scenario identification circuit (e.g. critical scenario predictor/detector 306), and a measurement report control circuit (e.g. measurement report controller 308). The measurement circuit may be configured to measure one or more received radio signals to generate one or more measurement results. The critical scenario identification circuit may be configured to perform a comparison between a first set of the one or more measurement results and predefined criteria associated with one or more critical scenarios, wherein the one or more critical scenarios indicate handover disruption. The measurement report control circuit may be configured to select a selected reporting configuration from a default handover speed reporting configuration and an accelerated handover speed reporting configuration based on the comparison, wherein the accelerated handover speed reporting configuration provides a lower expected handover latency than the default handover speed reporting configuration, and transmit a second set of the one or more measurement results according to the selected reporting configuration.

A mobile terminal according to a further aspect of this disclosure, e.g. UE 300, may similarly include a measurement circuit (e.g. RF circuit 304), a critical scenario identification circuit (e.g. critical scenario predictor/detector 306), and a measurement report control circuit (e.g. measurement report controller 308). The measurement circuit may be configured to receive a default handover speed reporting configuration from a serving cell, and measure one or more radio signals received from the serving cell and a neighbor cell to generate one or more measurement results. The critical scenario identification circuit may be configured to determine if a first set of the one or more measurement results satisfy predefined criteria associated with one or more critical scenarios, wherein the one or more critical scenarios indicate handover disruption caused by interference associated with the neighbor cell. The measurement report control circuit may be configured to transmit a second set of the one or more measurement results according to an accelerated handover speed reporting configuration if the critical scenario identification circuit determines that the first set of the one or more measurements satisfy the predefined criteria associated with at least one of the one or more critical scenarios, wherein the accelerated handover speed reporting configuration provides a lower expected handover latency than the default handover speed reporting configuration.

It is appreciated that the alternate measurement reporting protocols may be implemented solely on the UE-side, and accordingly may not require any adjustment of network-side components such as base stations. However, it is similarly understood that network-side modification may be used to accomplish similar results.

The examples pertain to further aspects of this disclosure:

Example 1 is a method for processing one or more received radio signals including measuring the one or more received radio signals to generate one or more measurement results, performing a comparison between a first set of the one or more measurement results and predefined criteria associated with handover disruption, electing a selected reporting configuration from a default handover speed reporting configuration and an accelerated handover speed reporting configuration based on the comparison, wherein the accelerated handover speed reporting configuration provides a lower expected handover latency than the default handover speed reporting configuration, and transmitting a second set of the one or more measurement results according to the selected reporting configuration.

In Example 2, the subject matter of Example 1 can optionally further include receiving the one or more received radio signals from a serving cell or a neighbor cell.

In Example 3, the subject matter of Example 2 can optionally include wherein the predefined criteria indicate handover disruption caused by interference associated with the neighbor cell.

In Example 4, the subject matter of Example 1 can optionally further include receiving the default handover speed reporting configuration from a serving cell.

In Example 5, the subject matter of Example 4 can optionally include wherein the measuring the one or more received radio signals to generate one or more measurement results includes measuring at least one radio signal received from the serving cell to generate at least one of the one or more measurement results.

In Example 6, the subject matter of Example 5 can optionally include wherein the measuring the one or more received radio signals to generate one or more measurement results further includes measuring at least one radio signal received from a neighbor cell to generate at least one of the one or more measurement results.

In Example 7, the subject matter of Example 1 can optionally include wherein the performing a comparison between a first set of the one or more measurement results and the predefined includes calculating a drop in serving cell signal-to-interference-plus-noise ratio (SINR) level over time based on one or more SINR measurement results of the first set of the one or more measurement results, and identifying if the drop in serving cell SINR level exceeds a SINR level drop threshold of the predefined criteria.

In Example 8, the subject matter of Example 7 can optionally include wherein the performing a comparison between a first set of the one or more measurement results and the predefined criteria includes calculating a final serving cell SINR level based on the one or more SINR measurement results of the first set of the one or more measurement results, and identifying if the final serving cell SINR level is less than an SINR resting threshold of the predefined criteria.

In Example 9, the subject matter of Example 8 can optionally include wherein the selecting a selected reporting configuration from a default handover speed reporting configuration and an accelerated handover speed reporting configuration based on the comparison includes selecting the accelerated handover speed reporting configuration as the selected reporting configuration if the drop in serving cell SINR level exceeds the SINR level drop threshold and the final serving cell SINR level is less than the SINR resting threshold.

In Example 10, the subject matter of Example 9 can optionally include wherein the selecting a selected reporting configuration from a default handover speed reporting configuration and an accelerated handover speed reporting configuration based on the comparison includes selecting the default handover speed reporting configuration as the selected reporting configuration if the drop in serving cell SINR level is below the SINR level drop threshold or the final serving cell SINR level is equal to or above the SINR resting threshold.

In Example 11, the subject matter of any one of Examples 7 to 10 can optionally include wherein the predefined criteria is associated with one or more mobile terminals migrating from a serving cell to a neighbor cell, and wherein the predefined criteria indicates handover disruption caused by interference from the neighbor cell.

In Example 12, the subject matter of Example 1 can optionally include wherein the performing a comparison between a first set of the one or more measurement results and the predefined criteria includes calculating a first reference signal receive quality (RSRQ) level of a neighbor cell based on one or more RSRQ measurement results of the first set of the one or more measurement results, and identifying if the first RSRQ level exceeds an RSRQ threshold of the predefined criteria.

In Example 13, the subject matter of Example 12 can optionally include wherein the performing a comparison between a first set of the one or more measurement results and the predefined criteria includes calculating a first reference signal receive power (RSRP) level of a serving cell based one or more RSRP measurement results of the first set of the one or more measurement results, calculating a second RSRP level of the neighbor cell based on the one or more RSRP measurement results of the first set of the one or more measurement results, and identifying if the difference between the first RSRP level and the second RSRP level exceeds an RSRP level offset threshold of the predefined criteria.

In Example 14, the subject matter of Example 13 can optionally include wherein the selecting a selected reporting configuration from a default handover speed reporting configuration and an accelerated handover speed reporting configuration based on the comparison includes selecting the accelerated handover speed reporting configuration as the selected reporting configuration if the first RSRQ level exceeds the RSRQ threshold and the difference between the first RSRQ level and the second RSRQ level exceeds the RSRP level offset threshold.

In Example 15, the subject matter of Example 14 can optionally include wherein the selecting a selected reporting configuration from a default handover speed reporting configuration and an accelerated handover speed reporting configuration based on the comparison includes selecting the default handover speed reporting configuration as the selected reporting configuration if the first RSRQ level is below the RSRQ threshold or the difference between the first RSRQ level or the second RSRQ level is equal to or above the RSRP level offset threshold.

In Example 16, the subject matter of any one of Examples 12 to 15 can optionally include wherein the predefined criteria is associated with the neighbor cell being lightly loaded and the neighbor cell having high signal power relative to the serving cell, and wherein the predefined criteria indicates handover disruption caused by interference from the neighbor cell.

In Example 17, the subject matter of Example 1 can optionally include wherein the performing a comparison between a first set of the one or more measurement results and the predefined criteria includes calculating a number of consecutively decreasing signal characteristic levels of a serving cell based on one or more signal characteristic measurement results of the first set of the one or more measurement results, and identifying if the number of consecutively decreasing signal characteristic levels of the serving cell exceeds a first trend quantity threshold of the predefined criteria.

In Example 18, the subject matter of Example 17 can optionally include wherein the selecting a selected reporting configuration from a default handover speed reporting configuration and an accelerated handover speed reporting configuration based on the comparison includes selecting the accelerated handover speed reporting configuration as the selected reporting configuration if the number of consecutively decreasing signal characteristic levels of the serving cell exceeds the first trend quantity threshold.

In Example 19, the subject matter of Example 18 can optionally include wherein the selecting a selected reporting configuration from a default handover speed reporting configuration and an accelerated handover speed reporting configuration based on the comparison includes selecting the default handover speed reporting configuration as the selected reporting configuration if the number of consecutively decreasing signal characteristic levels of the serving cell does not exceed the first trend quantity threshold.

In Example 20, the subject matter of any one of Examples to 19, can optionally include the predefined criteria is associated with a decreasing trend in the signal characteristic levels of the serving cell, and wherein predefined indicates handover disruption cause by interference from a neighbor cell.

In Example 21, the subject matter of Example 17 can optionally include wherein the performing a comparison between a first set of the one or more measurement results and the predefined criteria includes calculating a number of consecutively increasing signal characteristic levels of a neighbor cell based on the one or more signal characteristic measurement results of the first set of the one or more measurement results, and identifying if the number of consecutively increasing signal characteristic levels of the neighbor cell exceeds a second trend quantity threshold of the predefined criteria.

In Example 22, the subject matter of Example 21 can optionally include wherein the selecting a selected reporting configuration from a default handover speed reporting configuration and an accelerated handover speed reporting configuration based on the comparison includes selecting the accelerated handover speed reporting configuration as the selected reporting configuration if the number of consecutively decreasing signal characteristic levels of the serving cell exceeds the first trend quantity threshold and the number of consecutively increasing signal characteristic levels of the neighbor cell exceeds the second trend quantity threshold.

In Example 23, the subject matter of Example 22 can optionally include wherein the selecting a selected reporting configuration from a default handover speed reporting configuration and an accelerated handover speed reporting configuration based on the comparison includes selecting the default handover speed reporting configuration as the selected reporting configuration if the number of consecutively decreasing signal characteristic levels of the serving cell is below the first trend quantity threshold or the number of consecutively increasing signal characteristic levels of the neighbor cell is below the second trend quantity threshold.

In Example 24, the subject matter of any one of Examples 21 to 23 can optionally include wherein the predefined criteria is associated with a decreasing trend in the signal characteristic levels of the serving cell and an increasing trend in the signal characteristic levels of the neighbor cell, and wherein the predefined criteria indicates handover disruption cause by interference from the neighbor cell.

In Example 25, the subject matter of any one of Examples 17 to 24 can optionally include wherein the signal characteristic levels are signal power levels or signal quality levels.

In Example 26, the subject matter of Example 1 can optionally include wherein the selecting a selected reporting configuration from a default handover speed reporting configuration and an accelerated handover speed reporting configuration based on the comparison includes selecting the accelerated handover speed reporting configuration as the selected reporting configuration if the comparison indicates that the first set of the one or more measurement results indicates that a serving cell signal-to-interference-plus-noise ratio (SINR) has experienced an abrupt decline, wherein the comparison is based on the predefined criteria.

In Example 27, the subject matter of Example 1 or 26 can optionally include wherein the selecting a selected reporting configuration from a default handover speed reporting configuration and an accelerated handover speed reporting configuration based on the comparison includes selecting the accelerated handover speed reporting configuration as the selected reporting configuration if the comparison determines that the first set of the one or more measurement results indicates that a neighbor cell is lightly loaded and the neighbor cell has high signal power compared to a serving cell, wherein the comparison is based on the predefined criteria.

In Example 28, the subject matter of any one of Examples 1, 26, or 27 can optionally include wherein the selecting a selected reporting configuration from a default handover speed reporting configuration and an accelerated handover speed reporting configuration based on the comparison includes selecting the accelerated handover speed reporting configuration as the selected reporting configuration if the comparison determines that the first set of the one or more measurement results indicates that a signal characteristic of a serving cell is constantly decreasing over time, wherein the comparison is based on the predefined criteria.

In Example 29, the subject matter of any one of Examples 1 or 26 to 28 can optionally include wherein the performing a comparison between a first set of the one or more measurement results and the predefined criteria includes comparing a measurement result of the first set of the one or more measurement results with a predefined SINR metric, a predefined reference signal receive power (RSRP) metric, or a predefined reference signal receive quality (RSRQ) metric, wherein the measurement result is associated with a serving cell or a neighbor cell.

In Example 30, the subject matter of any one of Examples 1 or 26 to 29 can optionally include wherein the transmitting a second set of the one or more measurement results according to the accelerated handover speed reporting configuration includes adjusting an event-triggered measurement reporting parameter of the default handover speed reporting configuration to obtain an adjusted event-triggered measurement reporting parameter, and transmitting the second set of the one or more measurement results as an event-triggered measurement report according to the adjusted event-triggered measurement reporting parameter.

In Example 31, the subject matter of Example 30 can optionally include wherein the adjusted event-triggered measurement reporting parameter is associated with a lower event-triggered measurement report latency than the event-triggered measurement reporting parameter.

In Example 32, the subject matter of Example 30 can optionally include wherein the adjusting an event-triggered measurement reporting parameter of the default handover speed reporting configuration to obtain an adjusted event-triggered measurement reporting parameter includes increasing or decreasing a threshold value of the default handover speed reporting configuration, increasing or decreasing an offset value of the default handover speed reporting configuration, decreasing a time to trigger value of the default handover speed reporting configuration, or adjusting a filtering value of the default handover speed reporting configuration.

In Example 33, the subject matter of any one of Examples 1 or 26 to 29 can optionally include wherein the transmitting a second set of the one or more measurement results according to the accelerated handover speed reporting configuration includes adjusting at least one measurement result of the second set of the one or more measurement results to generate an adjusted set of one or more measurement results, and transmitting the adjusted set of one or more measurement results as a measurement report.

In Example 34, the subject matter of Example 33 can optionally include wherein the adjusting at least one measurement result of the second set of the one or more measurement results to generate an adjusted set of one or more measurement results includes increasing a measurement result associated with a neighbor cell or decreasing a measurement result associated with a serving cell to generate an adjusted measurement of the adjusted set of one or more measurement results.

In Example 35, the subject matter of any one of Examples 1, 26 to 31, or 33 can optionally further include receiving the default handover speed reporting configuration from a serving cell, and wherein the transmitting a second set of the one or more measurement results according to the selected reporting configuration includes transmitting the second set of the one or more measurement results as a measurement report to the serving cell.

In Example 36, the subject matter of Example 35 can optionally include wherein the measuring the one or more received radio signals to generate one or more measurement results includes measuring the one or more received radio signals according to the default handover speed reporting configuration to generate the second set of the one or more measurement results.

In Example 37, the subject matter of any one of Examples 1, 26 to 31, 33, 35, or 36 can optionally include wherein the second set of the one or more measurement results includes at least one measurement result of the first set of the one or more measurement results.

Example 38 is a mobile terminal device. The mobile terminal device includes a measurement circuit configured to measure one or more received radio signals to generate one or more measurement results, a critical scenario identification circuit configured to perform a comparison between a first set of the one or more measurement results and predefined criteria associated with handover disruption, and a measurement report control circuit configured to select a selected reporting configuration from a default handover speed reporting configuration and an accelerated handover speed reporting configuration based on the comparison, wherein the accelerated handover speed reporting configuration produces a lower expected handover latency than the default handover speed reporting configuration, and transmit a second set of the one or more measurement results according to the selected reporting configuration.

In Example 39, the subject matter of Example 38 can optionally include wherein the measurement circuit is further configured to receive the one or more received radio signals from a serving cell or a neighbor cell.

In Example 40, the subject matter of Example 38 can optionally include wherein the measurement circuit is configured to measure one or more received radio signals to generate one or more measurement results by performing measurements on one or more received reference signals.

In Example 41, the subject matter of Example 38 can optionally include wherein the mobile terminal device is further configured to receive the default handover speed reporting configuration from a serving cell.

In Example 42, the subject matter of Example 41 can optionally include wherein the measurement circuit is configured to measure one or more received radio signals to generate one or more measurement results by measuring at least one radio signal received from the serving cell to generate at least one of the one or more measurement results.

In Example 43, the subject matter of Example 42 can optionally include wherein the measurement circuit is further configured to measure one or more received radio signals to generate one or more measurement results by measuring at least one radio signal received from a neighbor cell to generate at least one of the one or more measurement results.

In Example 44, the subject matter of Example 38 can optionally include wherein the critical scenario identification circuit is configured to perform a comparison between a first set of the one or more measurement results and the predefined criteria associated by calculating a drop in serving cell signal-to-interference-plus-noise ratio (SINR) level over time based on one or more SINR measurement results of the first set of the one or more measurement results, and identifying if the drop in serving cell SINR level exceeds a SINR level drop threshold of the predefined criteria.

In Example 45, the subject matter of Example 44 can optionally include wherein the critical scenario identification circuit is further configured to perform a comparison between a first set of the one or more measurement results and the predefined criteria by calculating a final serving cell SINR level based on the one or more SINR measurement results of the first set of the one or more measurement results, and identifying if the final serving cell SINR level is less than an SINR resting threshold of the predefined criteria.

In Example 46, the subject matter of Example 45 can optionally include wherein the measurement report control circuit is configured to select a selected reporting configuration from a default handover speed reporting configuration and an accelerated handover speed reporting configuration based on the comparison by selecting the accelerated handover speed reporting configuration as the selected reporting configuration if the drop in serving cell SINR level exceeds the SINR level drop threshold and the final serving cell SINR level is less than the SINR resting threshold.

In Example 47, the subject matter of Example 46 can optionally include wherein the measurement report control circuit is configured to select a selected reporting configuration from a default handover speed reporting configuration and an accelerated handover speed reporting configuration based on the comparison by selecting the default handover speed reporting configuration as the selected reporting configuration if the drop in serving cell SINR level does not exceed the SINR level drop threshold or the final serving cell SINR level is not less than the SINR resting threshold.

In Example 48, the subject matter of Example 38 can optionally include wherein the mobile terminal device is configured to operate on a Long Term Evolution (LTE) network.

In Example 49, the subject matter of Example 38 can optionally include wherein the critical scenario identification circuit is configured to perform a comparison between a first set of the one or more measurement results and the predefined criteria by calculating a first reference signal receive quality (RSRQ) level of a neighbor cell based on one or more RSRQ measurement results of the first set of the one or more measurement results, and identifying if the first RSRQ level exceeds an RSRQ threshold of the predefined criteria.

In Example 50, the subject matter of Example 49 can optionally include wherein the critical scenario identification circuit is further configured to perform a comparison between a first set of the one or more measurement results and the predefined criteria by calculating a first reference signal receive power (RSRP) level of a serving cell based one or more RSRP measurement results of the first set of the one or more measurement results, calculating a second RSRP level of the neighbor cell based on the one or more RSRP measurement results of the first set of the one or more measurement results, and identifying if the difference between the first RSRP level and the second RSRP level exceeds an RSRP level offset threshold of the predefined criteria.

In Example 51, the subject matter of Example 50 can optionally include wherein the measurement report control circuit is configured to select a selected reporting configuration from a default handover speed reporting configuration and an accelerated handover speed reporting configuration based on the comparison by selecting the accelerated handover speed reporting configuration as the selected reporting configuration if the first RSRQ level exceeds the RSRQ threshold and the difference between the first RSRQ level and the second RSRQ level exceeds the RSRP level offset threshold.

In Example 52, the subject matter of Example 51 can optionally include wherein the measurement report control circuit is configured to select a selected reporting configuration from a default handover speed reporting configuration and an accelerated handover speed reporting configuration based on the comparison by selecting the default handover speed reporting configuration as the selected reporting configuration if the first RSRQ level does not exceed the RSRQ threshold or the difference between the first RSRQ level and the second RSRQ level does not exceed the RSRP level offset threshold.

In Example 53, the subject matter of Example 38 can optionally include wherein the one or more measurement results include Reference Signal Receive Power (RSRP) measurements, Reference Signal Receive Quality (RSRQ) measurements, Signal-to-Interference-plus-Noise ratio (SINR) measurements, or Received Signal Strength Indicator (RSSI) measurements.

In Example 54, the subject matter of Example 38 can optionally include wherein the critical scenario identification circuit is configured to perform a comparison between a first set of the one or more measurement results and the predefined criteria by calculating a number of consecutively decreasing signal characteristic levels of a serving cell based on one or more signal characteristic measurement results of the first set of the one or more measurement results, and identifying if the number of consecutively decreasing signal characteristic levels of the serving cell exceeds a first trend quantity threshold of the predefined criteria.

In Example 55, the subject matter of Example 54 can optionally include wherein the measurement report control circuit is configured to select a selected reporting configuration from a default handover speed reporting configuration and an accelerated handover speed reporting configuration based on the comparison by selecting the accelerated handover speed reporting configuration as the selected reporting configuration if the number of consecutively decreasing signal characteristic levels of the serving cell exceeds the first trend quantity threshold.

In Example 56, the subject matter of Example 55 can optionally include wherein the measurement report control circuit is configured to select a selected reporting configuration from a default handover speed reporting configuration and an accelerated handover speed reporting configuration based on the comparison by selecting the default handover speed reporting configuration as the selected reporting configuration if the number of consecutively decreasing signal characteristic levels of the serving cell does not exceed the first trend quantity threshold.

In Example 57, the subject matter of Example 38 can optionally include wherein the predefined criteria are associated with handover disruption caused by wireless interference.

In Example 58, the subject matter of Example 54 can optionally include wherein the critical scenario identification circuit is further configured to perform a comparison between a first set of the one or more measurement results and the predefined criteria by calculating a number of consecutively increasing signal characteristic levels of a neighbor cell based on the one or more signal characteristic measurement results of the first set of the one or more measurement results, and identifying if the number of consecutively increasing signal characteristic levels of the neighbor cell exceeds a second trend quantity threshold of the predefined criteria.

In Example 59, the subject matter of Example 58 can optionally include wherein the measurement report control circuit is configured to select a selected reporting configuration from a default handover speed reporting configuration and an accelerated handover speed reporting configuration based on the comparison by selecting the accelerated handover speed reporting configuration as the selected reporting configuration if the number of consecutively decreasing signal characteristic levels of the serving cell exceeds the first trend quantity threshold and the number of consecutively increasing signal characteristic levels of the neighbor cell exceeds the second trend quantity threshold.

In Example 60, the subject matter of Example 59 can optionally include wherein the measurement report control circuit is configured to select a selected reporting configuration from a default handover speed reporting configuration and an accelerated handover speed reporting configuration based on the comparison by selecting the default handover speed reporting configuration as the selected reporting configuration if the number of consecutively decreasing signal characteristic levels of the serving cell does not exceed the first trend quantity threshold or the number of consecutively increasing signal characteristic levels of the neighbor cell does not exceed the second trend quantity threshold.

In Example 61, the subject matter of Example 38 can optionally include wherein the measurement circuit is further configured to receive one or more reference signals from neighbor cells as the one or more received radio signals.

In Example 62, the subject matter of Example 61 can optionally include wherein the measurement circuit is configured to generate one or more measurement results based on the one or more reference signals received from neighbor cells.

In Example 63, the subject matter of Example 38 can optionally include wherein the measurement report control circuit is configured to select a selected reporting configuration from a default handover speed reporting configuration and an accelerated handover speed reporting configuration based on the comparison by selecting the accelerated handover speed reporting configuration as the selected reporting configuration if the comparison determines that the first set of the one or more measurement results indicates that a serving cell signal-to-interference-plus-noise ratio (SINR) has experienced an abrupt decline, wherein the comparison is based on the predefined criteria.

In Example 64, the subject matter of Example 38 or 63 can optionally include wherein the measurement report control circuit is configured to select a selected reporting configuration from a default handover speed reporting configuration and an accelerated handover speed reporting configuration based on the comparison by selecting the accelerated handover speed reporting configuration as the selected reporting configuration if the comparison determines that the first set of the one or more measurement results indicates that a neighbor cell is lightly loaded and the neighbor cell has high signal power compared to a serving cell, wherein the comparison is based on the predefined criteria.

In Example 65, the subject matter of Example 38, 63, or 64 can optionally include wherein the measurement report control circuit is configured to select a selected reporting configuration from a default handover speed reporting configuration and an accelerated handover speed reporting configuration based on the comparison by selecting the accelerated handover speed reporting configuration as the selected reporting configuration if the comparison determines that the first set of the one or more measurement results indicates that a signal characteristic of a serving cell is constantly decreasing over time, wherein the comparison is based on the predefined criteria.

In Example 66, the subject matter of Example 38 can optionally include wherein the critical scenario identification circuit is further configured to perform a comparison between a first set of the one or more measurement results and the predefined criteria by comparing a measurement result of the first set of the one or more measurement results with a predefined SINR metric, a predefined reference signal receive power (RSRP) metric, or a predefined reference signal receive quality (RSRQ) metric, wherein the measurement result is associated with a serving cell or a neighbor cell.

In Example 67, the subject matter of any one of Examples 38 or 63 to 65 can optionally include wherein the measurement report control circuit is configured to transmit a second set of the one or more measurement results according to the accelerated handover speed reporting configuration by adjusting an event-triggered measurement reporting parameter of the default handover speed reporting configuration to obtain an adjusted event-triggered measurement reporting parameter, and transmitting the second set of the one or more measurement results as an event-triggered measurement report according to the adjusted event-triggered measurement reporting parameter.

In Example 68, the subject matter of Example 67 can optionally include wherein the measurement report control circuit is configured to adjust at least one measurement result of the second set of the one or more measurement results to generate an adjusted set of one or more measurement results by adjusting a measurement reporting parameter associated with the default handover speed reporting configuration.

In Example 69, the subject matter of Example 67 can optionally include wherein the measurement report control circuit is configured to adjust at least one measurement result of the second set of the one or more measurement results to generate an adjusted set of one or more measurement results by increasing or decreasing a threshold value of the default handover speed reporting configuration, increasing or decreasing an offset value of the default handover speed reporting configuration, decreasing a time to trigger value of the default handover speed reporting configuration, or adjusting a filtering value of the default handover speed reporting configuration.

In Example 70, the subject matter of any one of Examples 38 or 63 to 65 can optionally include wherein the measurement report control circuit is configured to transmit a second set of the one or more measurement results according to the accelerated handover speed reporting configuration by adjusting at least one measurement result of the second set of the one or more measurement results to generate an adjusted set of one or more measurement results, and transmitting the adjusted set of one or more measurement results as a measurement report.

In Example 71, the subject matter of Example 70 can optionally include wherein the measurement report control circuit is configured to adjust at least one measurement result of the second set of the one or more measurement results to generate an adjusted set of one or more measurement results by increasing a measurement result associated with a neighbor cell or decreasing a measurement result associated with a serving cell to generate an adjusted measurement of the adjusted set of one or more measurement results.

In Example 72, the subject matter of Example 38 can optionally include wherein the mobile terminal device is further configured to receive the default handover speed reporting configuration from a serving cell, and wherein the measurement report control circuit is configured to transmit a second set of the one or more measurement results according to the selected reporting configuration by transmitting the second set of the one or more measurement results as a measurement report to the serving cell.

In Example 73, the subject matter of Example 72 can optionally include wherein the measurement circuit is configured to measure the one or more received radio signals to generate one or more measurement results by measuring the one or more received radio signals according to the default handover speed reporting configuration to generate the second set of the one or more measurement results.

In Example 74, the subject matter of Example 38 can optionally include wherein the mobile terminal device is configured to receive the default handover speed reporting configuration while in a connected radio control mode.

Example 75 is a mobile terminal device. The mobile terminal device includes a measurement circuit configured to receive a default handover speed reporting configuration from a serving cell, and measure one or more radio signals received from the serving cell and a neighbor cell to generate one or more measurement results, a critical scenario identification circuit configured to determine if a first set of the one or more measurement results satisfy predefined criteria associated with handover disruption caused by interference associated with the neighbor cell, and a measurement report control circuit configured to transmit a second set of the one or more measurement results according to an accelerated handover speed reporting configuration if the critical scenario identification circuit determines that the first set of the one or more measurements satisfy the predefined criteria associated with handover disruption, wherein the accelerated handover speed reporting configuration provides a lower expected handover latency than the default handover speed reporting configuration.

In Example 76, the subject matter of Example 75 can optionally include wherein the measurement report control circuit is configured to transmit the second set of the one or more measurement results according to the default handover speed reporting configuration if the critical scenario identification circuit determines that the first set of the one or more measurements does not satisfy the predefined criteria.

In Example 77, the subject matter of Example 75 can optionally include wherein the one or more radio signals received from the serving cell and a neighbor cell are reference signals.

In Example 78, the subject matter of Example 75 can optionally include wherein the critical scenario identification circuit is configured to determine if a first set of the one or more measurement results satisfy the predefined criteria by calculating a drop in serving cell signal-to-interference-plus-noise ratio (SINR) level over time based on one or more SINR measurement results of the first set of the one or more measurement results, and identifying if the drop in serving cell SINR level exceeds a SINR level drop threshold of the predefined criteria.

In Example 79, the subject matter of Example 75 can optionally include wherein the critical scenario identification circuit is further configured to determine if a first set of the one or more measurement results satisfy the predefined criteria by calculating a final serving cell SINR level based on the one or more SINR measurement results of the first set of the one or more measurement results, and identifying if the final serving cell SINR level is less than an SINR resting threshold of the predefined criteria.

In Example 80, the subject matter of Example 79 can optionally include wherein the critical scenario identification circuit is configured to determine that the first set of the one or more measurement results satisfies the predefined criteria if the drop in serving cell SINR level exceeds the SINR level drop threshold and the final serving cell SINR level is less than the SINR resting threshold.

In Example 81, the subject matter of Example 80 can optionally include wherein the critical scenario identification circuit is configured to determine that the first set of the one or more measurement results does not satisfy the predefined criteria if the drop in serving cell SINR level does not exceed the SINR level drop threshold or the final serving cell SINR level is not less than the SINR resting threshold.

In Example 82, the subject matter of Example 75 can optionally include wherein the mobile terminal device is configured to operate on a Long Term Evolution (LTE) network.

In Example 83, the subject matter of Example 75 can optionally include wherein the critical scenario identification circuit is configured to determine if a first set of the one or more measurement results satisfy the predefined criteria by calculating a first reference signal receive quality (RSRQ) level of the neighbor cell based on one or more RSRQ measurement results of the first set of the one or more measurement results, and identifying if the first RSRQ level exceeds an RSRQ threshold of the predefined criteria.

In Example 84, the subject matter of Example 83 can optionally include wherein the critical scenario identification circuit is further configured to determine if a first set of the one or more measurement results satisfy the predefined criteria by calculating a first reference signal receive power (RSRP) level of the serving cell based one or more RSRP measurement results of the first set of the one or more measurement results, calculating a second RSRP level of the neighbor cell based on the one or more RSRP measurement results of the first set of the one or more measurement results, and identifying if the difference between the first RSRP level and the second RSRP level exceeds an RSRP level offset threshold of the predefined criteria.

In Example 85, the subject matter of Example 84 can optionally include wherein the critical scenario identification circuit is configured to determine that the first set of the one or more measurement results satisfies the predefined criteria if the first RSRQ level exceeds the RSRQ threshold and the difference between the first RSRQ level and the second RSRQ level exceeds the RSRP level offset threshold.

In Example 86, the subject matter of Example 85 can optionally include wherein the critical scenario identification circuit is configured to determine that the first set of the one or more measurement results does not satisfy the predefined criteria if the first RSRQ level does not exceed the RSRQ threshold or the difference between the first RSRQ level and the second RSRQ level does not exceed the RSRP level offset threshold.

In Example 87, the subject matter of Example 75 can optionally include wherein the one or more measurement results include Reference Signal Receive Power (RSRP) measurements, Reference Signal Receive Quality (RSRQ) measurements, Signal-to-Interference-plus-Noise ratio (SINR) measurements, or Received Signal Strength Indicator (RSSI) measurements.

In Example 88, the subject matter of Example 75 can optionally include wherein the critical scenario identification circuit is configured to determine if a first set of the one or more measurement results satisfy the predefined criteria by calculating a number of consecutively decreasing signal characteristic levels of the serving cell based on one or more signal characteristic measurement results of the first set of the one or more measurement results, and identifying if the number of consecutively decreasing signal characteristic levels of the serving cell exceeds a first trend quantity threshold of the predefined criteria.

In Example 89, the subject matter of Example 88 can optionally include wherein the critical scenario identification circuit is configured to determine that the first set of the one or more measurement results satisfies the predefined criteria if the number of consecutively decreasing signal characteristic levels of the serving cell exceeds the first trend quantity threshold.

In Example 90, the subject matter of Example 89 can optionally include wherein the critical scenario identification circuit is configured to determine that the first set of the one or more measurement results does not satisfy the predefined criteria if the number of consecutively decreasing signal characteristic levels of the serving cell does not exceed the first trend quantity threshold.

In Example 91, the subject matter of Example 88 can optionally include wherein the critical scenario identification circuit is further configured to determine if a first set of the one or more measurement results satisfy the predefined criteria by calculating a number of consecutively increasing signal characteristic levels of the neighbor cell based on the one or more signal characteristic measurement results of the first set of the one or more measurement results, and identifying if the number of consecutively increasing signal characteristic levels of the neighbor cell exceeds a second trend quantity threshold of the predefined criteria.

In Example 92, the subject matter of Example 91 can optionally include wherein the critical scenario identification circuit is configured to determine that the first set of the one or more measurement results satisfies the predefined criteria if the number of consecutively decreasing signal characteristic levels of the serving cell exceeds the first trend quantity threshold and the number of consecutively increasing signal characteristic levels of the neighbor cell exceeds the second trend quantity threshold.

In Example 93, the subject matter of Example 92 can optionally include wherein the critical scenario identification circuit is configured to determine that the first set of the one or more measurement results does not satisfy the predefined criteria if the number of consecutively decreasing signal characteristic levels of the serving cell does not exceed the first trend quantity threshold or the number of consecutively increasing signal characteristic levels of the neighbor cell does not exceed the second trend quantity threshold.

In Example 94, the subject matter of any one of Examples 88 to 93 can optionally include wherein the signal characteristic levels are signal power levels or signal quality levels.

In Example 95, the subject matter of Example 75 can optionally include wherein the measurement circuit is configured to receive the default handover speed reporting configuration from the serving cell while the mobile terminal device is in a connected radio control mode.

In Example 96, the subject matter of Example 75 can optionally include wherein the critical scenario identification circuit is configured to determine that the first set of the one or more measurement results satisfies the predefined criteria if the first set of the one or more measurement results indicates that the serving cell signal-to-interference-plus-noise ratio (SINR) has experienced an abrupt decline.

In Example 97, the subject matter of Example 75 can optionally include wherein the critical scenario identification circuit is configured to determine that the first set of the one or more measurement results satisfies the predefined criteria if the first set of the one or more measurement results indicates that the neighbor cell is lightly loaded and the neighbor cell has high signal power compared to the serving cell.

In Example 98, the subject matter of Example 97 can optionally include wherein the critical scenario identification circuit is configured to determine that the first set of the one or more measurement results satisfies the predefined criteria if the first set of the one or more measurement results indicates that a signal characteristic of the serving cell is constantly decreasing over time.

In Example 99, the subject matter of Example 75 can optionally include wherein the critical scenario identification circuit is further configured to determine if a first set of the one or more measurement results satisfy predefined criteria by comparing a measurement result of the first set of the one or more measurement results with a predefined SINR metric, a predefined reference signal receive power (RSRP) metric, or a predefined reference signal receive quality (RSRQ) metric, wherein the measurement result is associated with the serving cell or the neighbor cell.

In Example 100, the subject matter of Example 75 can optionally include wherein the measurement report control circuit is configured to transmit a second set of the one or more measurement results according to an accelerated handover speed reporting configuration by adjusting an event-triggered measurement reporting parameter of the default handover speed reporting configuration to obtain an adjusted event-triggered measurement reporting parameter, and transmitting the second set of the one or more measurement results as an event-triggered measurement report to the serving cell according to the adjusted event-triggered measurement reporting parameter.

In Example 101, the subject matter of Example 100 can optionally include wherein the adjusted event-triggered measurement reporting parameter is associated with a lower event-triggered measurement report latency than the event-triggered measurement reporting parameter.

In Example 102, the subject matter of Example 100 can optionally include wherein the measurement report control circuit is configured to adjust at least one measurement result of the second set of the one or more measurement results to generate an adjusted set of one or more measurement results by increasing or decreasing a threshold value of the default handover speed reporting configuration, increasing or decreasing an offset value of the default handover speed reporting configuration, decreasing a time to trigger value of the default handover speed reporting configuration, or adjusting a filtering value of the default handover speed reporting configuration.

In Example 103, the subject matter of Example 75 can optionally include wherein the measurement report control circuit is configured to transmit a second set of the one or more measurement results according to an accelerated handover speed reporting configuration by adjusting at least one measurement results of the second set of the one or more measurement results to generate an adjusted set of one or more measurement results, and transmitting the adjusted set of one or more measurement results as a measurement report to the serving cell.

In Example 104, the subject matter of Example 103 can optionally include wherein the measurement report control circuit is configured to adjust at least one measurement result of the second set of the one or more measurement results to generate an adjusted set of one or more measurement results by increasing a measurement result associated with the neighbor cell or decreasing a measurement result associated with the serving cell to generate an adjusted measurement of the adjusted set of one or more measurement results.

In Example 105, the subject matter of Example 75 can optionally include wherein the measurement circuit is configured to measure radio signals received from the serving cell and the neighbor cell to generate one or more measurement results by measuring the one or more received radio signals according to the default handover speed reporting configuration to generate the second set of the one or more measurement results.

In Example 106, the subject matter of Example 75 can optionally include wherein the second set of the one or more measurement results includes at least one measurement result of the first set of the one or more measurement results.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A method for anticipating increased interference in a serving cell comprising:
    by a mobile terminal device:
        measuring a signal strength of the serving cell;
        measuring a signal strength of one or more neighboring cells;

determining if the signal strength of the one or more neighboring cells is above a predefined threshold for the one or more neighboring cells;

determining if the signal strength of the serving cell is below a predefined threshold for the serving cell;

measuring a load of the one or more neighboring cells;

determining if the load of the one or more neighboring cells is below a predefined load threshold;

generating an alternate measurement reporting protocol, wherein the alternate measurement reporting protocol includes an accelerated handover speed reporting configuration; and selecting a reporting configuration from a predetermined handover speed reporting configuration and the accelerated handover speed reporting configuration, wherein the accelerated handover speed reporting configuration provides a handover latency lower than the predetermined handover speed reporting configuration.

2. The method of claim 1, wherein the predefined threshold for the one or more neighboring cells is greater than the predefined threshold for the serving cell.

3. The method of claim 1, wherein the predefined threshold for the one or more neighboring cells is the signal strength of the serving cell.

4. The method of claim 1, wherein determining if the load of the one or more neighboring cells comprises:

measuring a reference-signal-received-quality (RSRQ) of the one or more neighboring cells.

5. The method of claim 1, wherein generating the alternative measurement reporting protocol further comprises:

adjusting a measurement report parameter for the accelerated handover speed reporting configuration.

6. The method of claim 1, wherein measuring the signal strength of the serving cell generates measurement results.

7. The method of claim 6, wherein when the accelerated handover speed reporting configuration is selected, the method further comprises:

biasing one or more of the measurement results.

8. A mobile terminal device comprising:

one or more memory mediums; and at least one processor, wherein the at least one processor is configured to execute instructions stored on the one or more memory mediums to cause the mobile terminal device to:

measure a signal strength of a serving cell;

measure a signal strength of one or more neighboring cells;

determine if the signal strength of the one or more neighboring cells is above a predefined threshold for the one or more neighboring cells;

determine if the signal strength of the serving cell is below a predefined threshold for the serving cell;

measure a load of the one or more neighboring cells;

determine if the load of the one or more neighboring cells is below a predefined load threshold;

generate an alternate measurement reporting protocol, wherein the alternate measurement reporting protocol includes an accelerated handover speed reporting configuration; and select a reporting configuration from a predetermined handover speed reporting configuration and the accelerated handover speed reporting configuration, wherein the accelerated handover speed reporting configuration provides a handover latency lower than the predetermined handover speed reporting configuration.

9. The mobile terminal device of claim 8, wherein the predefined threshold for the one or more neighboring cells is greater than the predefined threshold for the serving cell.

10. The mobile terminal device of claim 8, wherein the predefined threshold for the one or more neighboring cells is the signal strength of the serving cell.

11. The mobile terminal device of claim 8, wherein determining if the load of the one or more neighboring cells comprises:

measuring a reference-signal-received-quality (RSRQ) of the one or more neighboring cells.

12. The mobile terminal device of claim 8, wherein generating the alternative measurement reporting protocol further comprises:

adjusting a measurement report parameter for the accelerated handover speed reporting configuration.

13. The mobile terminal device of claim 8, wherein measurement of the signal strength of the serving cell generates measurement results.

14. The mobile terminal device of claim 13, wherein when the accelerated handover speed reporting configuration is selected, the mobile terminal device is further configured to:

bias one or more of the measurement results.

15. A method for anticipating increased interference in a serving cell comprising:

by a mobile terminal device:

measuring signal-to-interference-plus-noise ratio (SINR) of a serving cell to generate a plurality of SINR measurement results for the serving cell;

monitoring the plurality of SINR measurement results for the serving cell to determine a number of consecutive decreasing measurement results for the serving cell when compared to one or more preceding measurement results;

determining that the SINR of the serving cell is below a predefined threshold;

measuring a plurality of signal indicators of one or more neighboring cells;

processing the plurality of signal indicators to determine that a plurality of user equipment have undergone a handover to the one or more neighboring cells;

generating an alternate measurement reporting protocol, wherein the alternate measurement reporting protocol includes an accelerated handover speed reporting configuration; and selecting a reporting configuration from a predetermined handover speed reporting configuration and the accelerated handover speed reporting configuration, wherein the accelerated handover speed reporting configuration provides a handover latency lower than the predetermined handover speed reporting configuration.

16. The method of claim 15, wherein the plurality of signal indicators includes signal-to-interference-plus-noise ratio.

17. The method of claim 15, wherein generating the alternative measurement reporting protocol further comprises:

adjusting a measurement report parameter for the accelerated handover speed reporting configuration.

18. The method of claim 15, wherein when the accelerated handover speed reporting configuration is selected, the method further comprises:

biasing one or more of the measurement results.

19. The method of claim 12, wherein the predefined threshold is an SINK resting threshold.

20. The method of claim 12, wherein the predefined threshold is an SINR level drop threshold.

* * * * *